US011227296B2

(12) United States Patent
Ono

(10) Patent No.: US 11,227,296 B2
(45) Date of Patent: Jan. 18, 2022

(54) INFORMATION PROCESSING SYSTEM AND INFORMATION PROCESSING METHOD

(71) Applicant: SONY CORPORATION, Tokyo (JP)

(72) Inventor: Hideyuki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 812 days.

(21) Appl. No.: 15/747,469

(22) PCT Filed: May 19, 2016

(86) PCT No.: PCT/JP2016/064837
§ 371 (c)(1),
(2) Date: Jan. 25, 2018

(87) PCT Pub. No.: WO2017/029848
PCT Pub. Date: Feb. 23, 2017

(65) Prior Publication Data
US 2018/0218379 A1 Aug. 2, 2018

(30) Foreign Application Priority Data

Aug. 18, 2015 (JP) .............................. JP2015-161067

(51) Int. Cl.
*G06Q 30/02* (2012.01)
*G06Q 10/10* (2012.01)
*G06Q 30/06* (2012.01)
(52) U.S. Cl.
CPC ......... *G06Q 30/0202* (2013.01); *G06Q 10/10* (2013.01); *G06Q 30/0201* (2013.01); *G06Q 30/0631* (2013.01)
(58) Field of Classification Search
None
See application file for complete search history.

(56) References Cited

U.S. PATENT DOCUMENTS 9,026,476 B2  5/2015 Bist
2011/0289454 A1 11/2011 Houllier et al.
(Continued)

FOREIGN PATENT DOCUMENTS

CN  102216929 A  10/2011
EP  2359269 A1  8/2011
(Continued)

OTHER PUBLICATIONS

Kalaiselvi et al, Automatic emotion recognition in video, 2014 International Conference on Green Computing Communication and Electrical Engineering (ICGCCEE), Date of Conference: Mar. 6-8, 2014, Date Added to IEEE Xplore: Oct. 16, 2014 (Year: 2014).*
International Search Report and Written Opinion of PCT Application No. PCT/JP2016/064837, dated Aug. 23, 2016, 09 pages.
Kajiwara, et al., "A Mood Prediction System for Preventing Diseases Using Biological Information and Weather Information, IEEJ Transactions on Electronics, Information and Systems", 2015, vol. 135, No. 6, 12 pages.

(Continued)

*Primary Examiner* — Patricia H Munson
*Assistant Examiner* — Chesiree A Walton
(74) *Attorney, Agent, or Firm* — Chip Law Group

(57) ABSTRACT

There is provided an information processing system including an accumulating unit that accumulates an emotion history in which a level of a specific emotion calculated on a basis of a behavior history of a user, a date and time and a position at which the specific emotion occurs, and an associated keyword are associated. The information processing system further includes a control unit that predicts a level of the specific emotion in a specific place at a specific date and time from a relation between at least any one of the specific date and time, the specific place, and a keyword associated with the date and time or the place and the emotion history accumulated in the accumulating unit.

11 Claims, 25 Drawing Sheets

(56) References Cited

U.S. PATENT DOCUMENTS

| | | | | |
|---|---|---|---|---|
| 2013/0346546 A1* | 12/2013 | Jung | ........................ | H04W 4/02 709/217 |
| 2014/0149177 A1* | 5/2014 | Frank | ...................... | G06F 40/30 705/7.29 |
| 2014/0350349 A1* | 11/2014 | Geurts | .................. | A61B 5/1118 600/300 |
| 2015/0356426 A1* | 12/2015 | Sanchez | ................. | G06N 5/022 706/55 |
| 2016/0232131 A1* | 8/2016 | Liu | ........................ | G06Q 10/06 |

FOREIGN PATENT DOCUMENTS

| | | | | |
|---|---|---|---|---|
| FR | 2938672 | A1 | | 5/2010 |
| JP | 09-81632 | A | | 3/1997 |
| JP | 2005063163 | A | * | 3/2005 |
| JP | 2012-509534 | A | | 4/2012 |
| JP | 2014-085811 | A | | 5/2014 |
| JP | 2014-146264 | A | | 8/2014 |
| KR | 10-2011-0086616 | A | | 7/2011 |
| WO | 2010/058134 | A1 | | 5/2010 |
| WO | 2015/107745 | A1 | | 7/2015 |

OTHER PUBLICATIONS

Taguchi, et al., "Visualization for Spatiotemporal Distribution of People's Rich Emotions", IPSJ SIG Technical Report, 2014, 11 pages.

Taguchi, et al., "Visualization for Spatiotemporal Distribution of People's Rich Emotions", IPSJ SIG Technical Reports, Mar. 2014, 11 pages.

Kajiwara, et al., "A Mood Prediction System for Preventing Diseases Using Biological Information and Weather Information", IEEJ Transactions on Electronics, Information and Systems, vol. 135, No. 6, pp. 570-579.

Office Action for JP Patent Application No. 2020-123310, dated Nov. 2, 2021, 02 pages of English Translation and 02 pages of Office Action.

Taguchi, et al., "Visualization for Spatiotemporal Distribution of People's Rich Emotions", Information Processing Society of Japan, vol. 2014-HCI-157, No. 36, Mar. 6, 2014, 11 pages.

Kajiwara, et al., "A Mood Prediction System for Preventing Diseases Using Biological Information and Weather Information", vol. 135, No. 6, Jun. 1, 2015, pp. 570-579.

* cited by examiner

FIG. 8

| expression | happiness level |
|---|---|
| WANT TO GO BUT CANNOT GO | -0.2 |
| A LITTLE HAPPY | 0.2 |
| HAPPY! | 0.5 |
| VERY HAPPY. SUPER HAPPY! HAPPY!! | 0.8 |

FIG. 9

| User_ID | Start_time | End_time | HAPPINESS FACTOR | | | MAXIMUM HAPPINESS STRENGTH | Happiness_ID | ITEM |
|---|---|---|---|---|---|---|---|---|
| | | | MEANS | CONTENTS | PLACE | | | |
| A | 2015/04/15 10:00 | 2015/04/15 10:00 | SNS | TOPIC OF X | HOME IN T CITY | 0.8 | 1 | |
| A | 2015/04/16 20:00 | 2015/04/16 20:54 | TELEVISION PROGRAM | PROGRAM OF X | HOME IN T CITY | 0.7 | 2 | |
| X | 2015/04/14 10:00 | 2015/04/14 12:00 | TELEVISION PROGRAM | PROGRAM OF X | TV STATION | 0.3 | 2 | |
| B | 2015/04/16 20:00 | 2015/04/16 20:54 | TELEVISION PROGRAM | PROGRAM OF X | HOME IN F CITY | 1 | 2 | |
| C | 2015/04/16 20:00 | 2015/04/16 20:54 | TELEVISION PROGRAM | PROGRAM OF X | HOME IN G CITY | 0.7 | 2 | |

FIG. 11

| expression | happiness coef |
|---|---|
| MEETING IS NOT POSSIBLE | -1 |
| TELEVISION PROGRAM | 1 |
| PUBLIC VIEWING | 1.5 |
| CONCERT | 2 |
| PARTICIPATE | 3 |

FIG. 12A

| User_ID | Start_time | End_time | HAPPINESS FACTOR ||| MAXIMUM HAPPINESS STRENGTH | Happiness_ID | ITEM |
| | | | MEANS | CONTENTS | PLACE | | | |
|---|---|---|---|---|---|---|---|---|
| A | 2015/03/20 18:30 | 2015/03/20 21:00 | CONCERT | PERFOR- MANCE OF X IN T CITY | T CITY | 1 | 10 | GLOW STICK |
| X | 2015/03/20 18:30 | 2015/03/20 21:00 | CONCERT | PERFOR- MANCE OF X IN T CITY | T CITY | 0.6 | 10 | GLOW STICK |
| B | 2015/03/20 18:30 | 2015/03/20 21:00 | CONCERT | PERFOR- MANCE OF X IN T CITY | T CITY | 1 | 10 | GLOW STICK |
| C | 2015/03/20 18:30 | 2015/03/20 21:00 | CONCERT | PERFOR- MANCE OF X IN T CITY | T CITY | 0.7 | 10 | |

FIG. 12B

| User_ID | Start_time | End_time | HAPPINESS FACTOR ||||  MAXIMUM HAPPINESS STRENGTH PREDICTION | Happiness_ID | ITEM |
| --- | --- | --- | --- | --- | --- | --- | --- | --- |
| | | | MEANS | CONTENTS | PLACE | | | |
| A | 2015/05/20 18:30 | 2015/05/20 21:00 | CONCERT | PERFOR- MANCE OF X IN O CITY | O CITY | 1 | 3 | |
| X | 2015/05/20 18:30 | 2015/05/20 21:00 | CONCERT | PERFOR- MANCE OF X IN O CITY | O CITY | 0.6 | 3 | |
| B | 2015/05/20 18:30 | 2015/05/20 21:00 | CONCERT | PERFOR- MANCE OF X IN O CITY | O CITY | 1 | 3 | |
| C | 2015/05/20 18:30 | 2015/05/20 21:00 | WORK | OVERTIME WORK | WORKPLACE | -0.7 | 4 | |

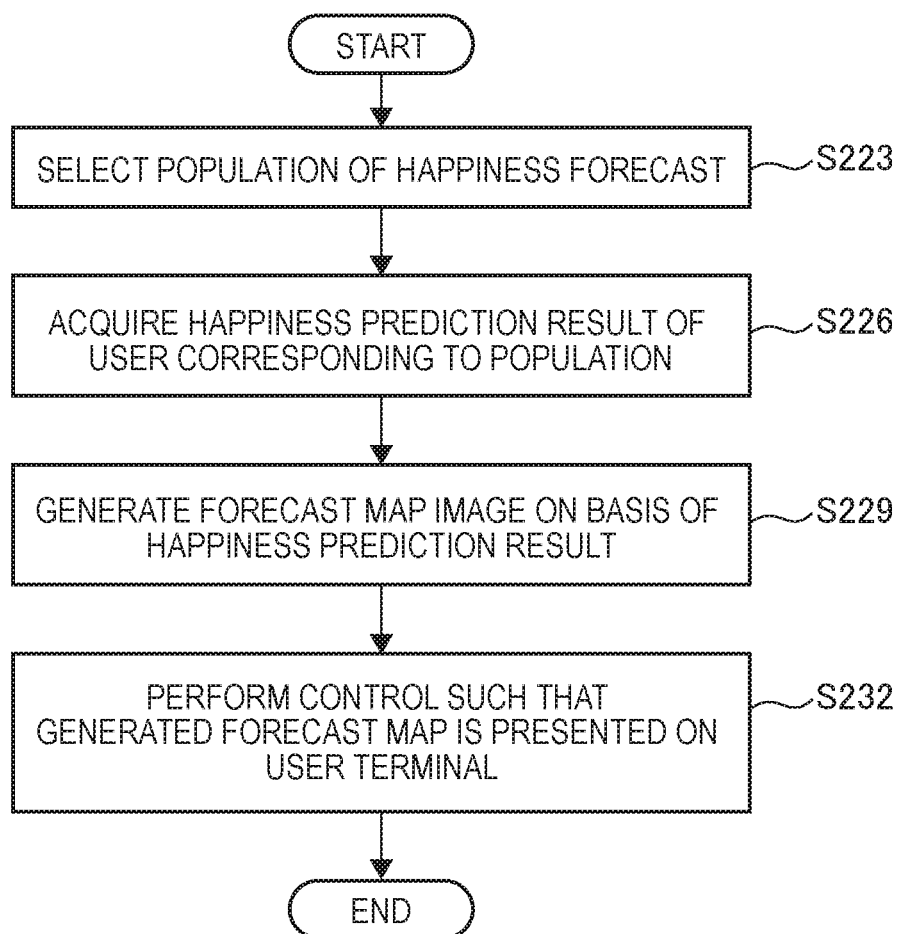

FIG. 20

| User_ID | Start_time | End_time | HAPPINESS FACTOR ||| MAXIMUM HAPPINESS STRENGTH | Happiness_ID | ITEM |
| --- | --- | --- | --- | --- | --- | --- | --- | --- |
| | | | MEANS | CONTENTS | PLACE | | | |
| A | 2014/06/14 15:00 | 2015/06/14 15:12 | SNS | TOPIC OF RAINBOW | T CITY | 0.7 | 20 | |
| A | 2014/07/02 14:00 | 2014/07/02 14:05 | SNS | TOPIC OF RAINBOW | T CITY | 0.8 | 30 | CAMERA |

INFORMATION PROCESSING SYSTEM AND INFORMATION PROCESSING METHOD

CROSS REFERENCE TO RELATED APPLICATIONS

This application is a U.S. National Phase of International Patent Application No. PCT/JP2016/064837 filed on May 19, 2016, which claims priority benefit of Japanese Patent Application No. JP 2015-161067 filed in the Japan Patent Office on Aug. 18, 2015. Each of the above-referenced applications is hereby incorporated herein by reference in its entirety.

TECHNICAL FIELD

The present disclosure relates to an information processing system and an information processing method.

BACKGROUND ART

In recent years, techniques for analyzing and estimating human emotions from various kinds of data have been proposed. For example, a system in which feedback on a television program is promoted to be input by an emotion choice such as anger, crying, laughing, or the like and aggregated and shared within a range of friends of a social service is disclosed in Patent Literature 1.

Further, a system in which a restaurant providing food is evaluated on the basis of a score corresponding to a feature quantity of a food image and a degree of smiling of a person eating the food is disclosed in Patent Literature 2. Further, a system in which an emotion state of a user on online content or an event is estimated, and an average emotion score of each user is generated is disclosed in Patent Literature 3.

CITATION LIST

Patent Literature

Patent Literature 1: JP 2014-85811A
Patent Literature 2: JP 2014-146264A
Patent Literature 3: U.S. Pat. No. 9,026,476B

DISCLOSURE OF INVENTION

Technical Problem

However, in the above-mentioned technologies, an emotion of the user at a past time point is analyzed, and an emotion which the user will have in the future is unable to be detected in advance.

In this regard, the present disclosure proposes an information processing system and an information processing method which are capable of predicting a level of a specific emotion at a specific time and place.

Solution to Problem

According to the present disclosure, there is proposed an information processing system, including: an accumulating unit configured to accumulate an emotion history in which a level of a specific emotion calculated on a basis of a behavior history of a user, a date and time and a position at which the specific emotion occurs, and an associated keyword are associated; and a control unit configured to predict a level of the specific emotion in a specific place at a specific date and time from a relation between at least any one of the specific date and time, the specific place, and a keyword associated with the date and time or the place and the emotion history accumulated in the accumulating unit.

According to the present disclosure, there is proposed an information processing method, including: accumulating in an accumulating unit, by a processor, an emotion history in which a level of a specific emotion calculated on a basis of a behavior history of a user, a date and time and a position at which the specific emotion occurs, and an associated keyword are associated; and predicting, by the processor, a level of the specific emotion in a specific place at a specific date and time from a relation between at least any one of the specific date and time, the specific place, and a keyword associated with the date and time or the place and the emotion history accumulated in the accumulating unit.

Advantageous Effects of Invention

As described above, according to the present disclosure, it is possible to predict a level of a specific emotion at a specific time and place.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a diagram illustrating an example of a happiness strength definition table according to the present embodiment.

FIG. 9 is a diagram illustrating an example of a happiness history according to the present embodiment.

FIG. 11 is a diagram illustrating an example of a happiness coefficient table according to the present embodiment.

FIG. 12A is a diagram illustrating an example of a happiness history according to the present embodiment.

FIG. 12B is a diagram illustrating an example of happiness prediction according to the present embodiment.

FIG. 13 is a flowchart illustrating a process of presenting a happiness prediction result according to the present embodiment.

FIG. 20 is a diagram illustrating an example of a happiness history of a user A according to the present embodiment.

MODE(S) FOR CARRYING OUT THE INVENTION

Figure 1:
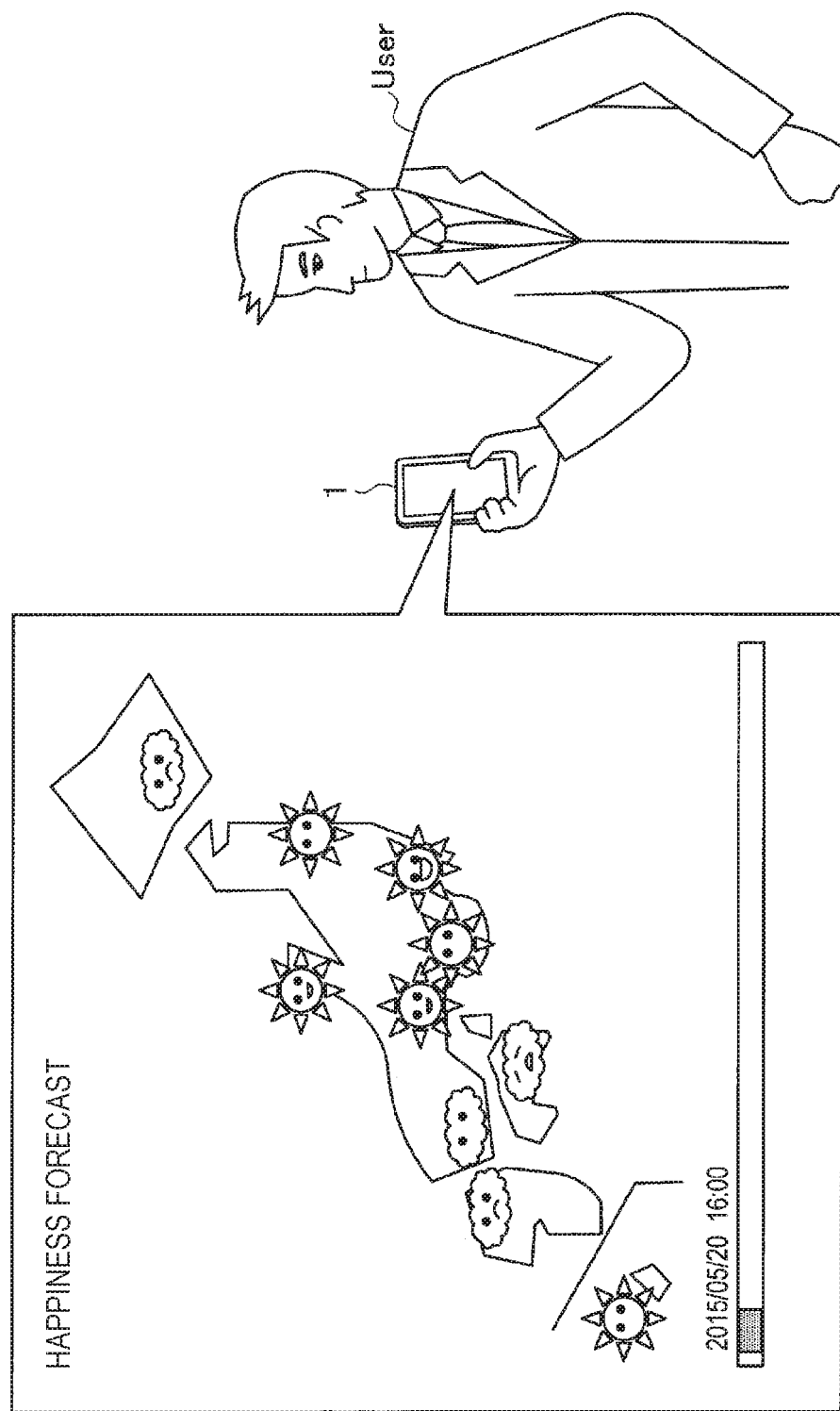
FIG. 1 is a diagram for describing an overview of an information processing system according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Overview of information processing system according to one embodiment of present disclosure
2. Configuration
2-1. Overall configuration
2-2. Configuration of user terminal
2-3. Configuration of happiness management server
3. Operation process
3-1. Happiness analysis process
3-2. Happiness forecast process for unspecified number of persons
3-3. Happiness forecast process for specific community
3-4. Personal happiness forecast process
4. Conclusion <<1. Overview of Information Processing System According to One Embodiment of Present Disclosure>>

In an information processing system according to the present embodiment, it is possible to accumulate a level of a specific emotion calculated on the basis of a behavior history of the user together with information of a time and a place of emotion occurrence, an associated keyword, or the like and predict a level of a specific emotion at a specific time and place. Further, the predicted level of the specific emotion is presented to the user as an "emotion forecast," and thus the user is able to know an emotion which the user is likely to have today in advance as if the user watches the weather forecast and know an emotion of each place changing over time.

Here, the "specific emotion" which is predicted and forecasted by the information processing system according to the present embodiment is at least one of six basic emotions (specifically, anger, hate, fear, joy, sadness, and surprise) or a combination thereof. Further, the specific emotion may occur in a state in which a person confronts a person or an object in a one-to-one, one-to-many, or many-to-many manner. A confronting method does not necessarily be performed in a face-to-face manner, and may be performed through, for example, a telephone, a telegraphic mail, an e-mail, an Internet protocol (IP) message, or the like. In other words, confronting objects may be at remote sites or may stay together in real time. A state in which communication is performed while sharing the same "space" is assumed. The "space" may be a large space such as a conference or a concert or a small space such as a meal or a telephone. Further, a face-to-face conversation is assumed as one-to-one communication between persons, and a situation such as a person watching a painting alone is assumed as one-to-one communication between a person and an object. Further, a situation in which fans are coming to see a solo singer concert is assumed as one-to-many communication between persons, and a situation in which members of a winning soccer team and supporters are sharing the joy of winning is assumed as many-to-many communication between persons. Further, a person-to-person "space" may be a place created through an object such as a situation of watching an entertainer on a television.

Further, in emotion prediction according to the present embodiment, it is possible to predict a level of a specific emotion (indicating a degree or strength) which has occurred irrespective of whether the specific emotion occurs. For example, a specific emotion to occur may be normalized to a value from 0 (minimum) to 1 (maximum), or from −1 (minimum) to 1 (maximum) as a value per unit time to express strength. In a case in which a specific emotion is normalized to a value from −1 (minimum) to 1 (maximum), for example, a calculation may be performed such that as a degree of emotion of "joy" increases, the value of the specific emotion level increases in a positive direction, and as "sadness" or "anger" increases in a negative direction, the value of the specific emotion level increases in a negative direction. Further, since each of persons in a corresponding place has the specific emotion, it is possible to obtain strength of a specific emotion of a "space" by calculating a specific emotion occurring in the "space" by summing up the levels of the specific emotions of all persons sharing the "space."

In the present embodiment, for example, a case of predicting and forecasting an emotion of "joy" (specifically, a situation in which a smile or an emotion such as happiness occurs (hereinafter referred to as "happiness")) will be described as an example of a specific emotion. Further, in the present embodiment, not only the presence or absence of the occurrence of happiness but also a strength of happiness (also referred to as "happiness strength") is predicted. An overview of the information processing system according to the present embodiment will be described below with reference to FIG. 1.

FIG. 1 is a diagram illustrating an overview of an information processing system according to one embodiment of the present disclosure. In the present embodiment, the happiness strength at a specific time and place is predicted on the basis of accumulated happiness history data and presented to the user as a happiness forecast. In the illustrated example, the user is able to check a nationwide happiness forecast using a user terminal 1 such as a smartphone. In a happiness forecast screen, icons corresponding to the happiness strengths are superimposed on a map and displayed as illustrated in FIG. 1. The icons corresponding to the happiness strengths may be applications of weather forecast marks to which the user is accustomed such as a sunny mark, a cloudy mark, a rainy mark, and the like, and a degree may be indicated by a facial expression of a face included in an icon. For example, in the same sunny mark, a happiness degree is stronger as a degree of smile on a facial expression is stronger. Further, as illustrated in FIG. 1, a date and time display and a time slider for designating a specific time are displayed on the happiness forecast screen. The user can know a nationwide happiness degree at a desired time by operating the time slider. Further, in the example illustrated in FIG. 1, the nationwide happiness degree is illustrated on the map, but the present embodiment is not limited to such an example, and a happiness degree of a province, a region, or a town may be displayed on a more detailed map, and a worldwide happiness degree may be displayed.

According to the present embodiment, for example, the user can check the nationwide happiness forecast in the morning on a domestic business trip day, know the happiness degree at a predetermined time at a business trip destination or a stopover point, and do preparation in advance.

The overview of the information processing system according to the present embodiment has been described above. Next, a configuration and an operation process of the information processing system according to the present embodiment will be specifically described.

<<2. Configuration>>
<2-1. Overall Configuration>

Figure 2:
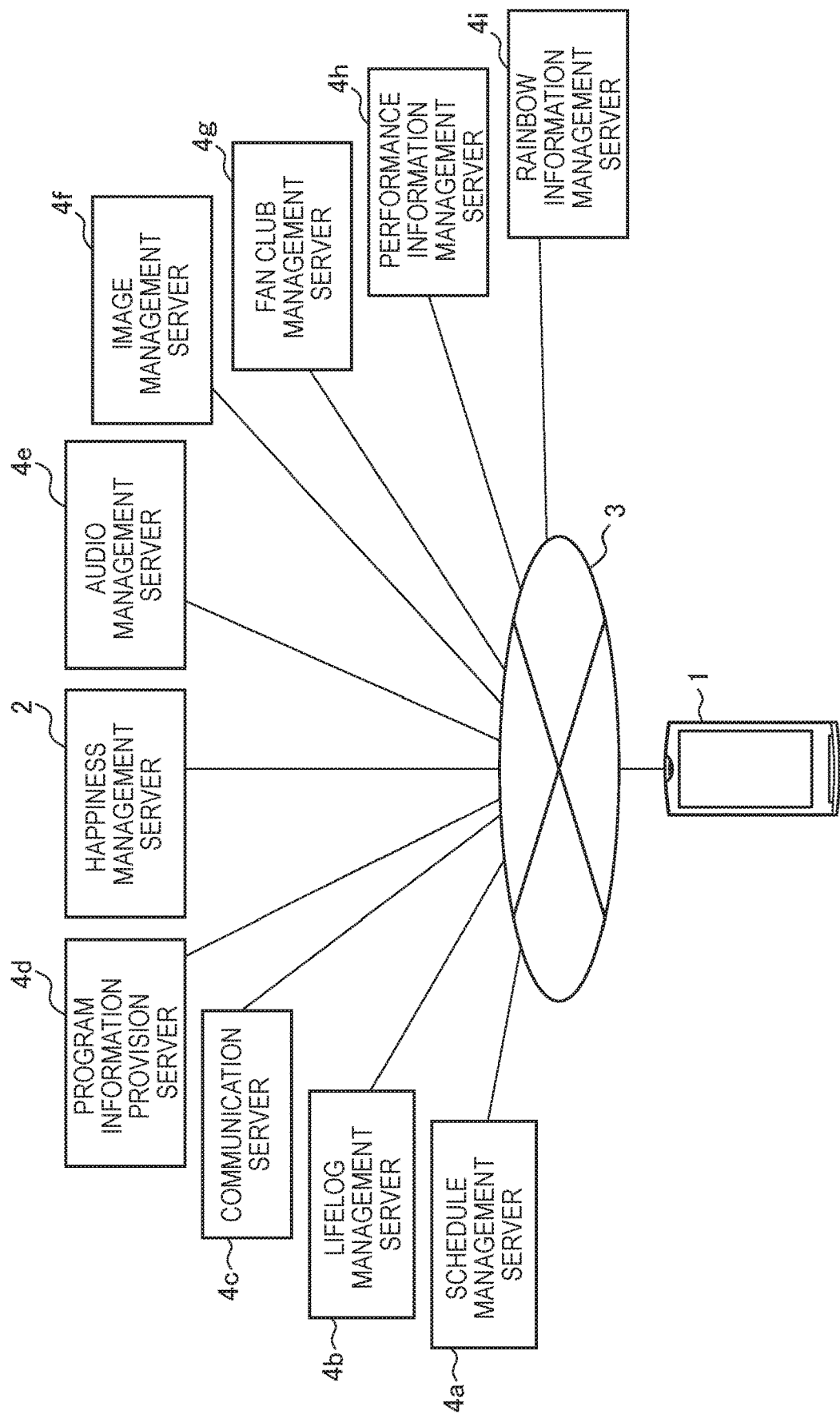
FIG. 2 is a diagram for describing an overall configuration of an information processing system according to the present embodiment.

FIG. 2 is a diagram for describing the overall configuration of the information processing system according to the present embodiment. As illustrated in FIG. 2, the information processing system according to the present embodiment includes the user terminal 1 and a happiness management server 2. The user terminal 1 and a happiness management server 2 are connected via a network 3. Further, when happiness analysis or prediction is performed, the happiness management server 2 acquires information from an external server 4 such as a schedule management server 4a, a lifelog management server 4b, a communication server 4c, a program information provision server 4d, an audio management server 4e, an image management server 4f, a fan club management server 4g, a performance information management server 4h, or a rainbow information management server 4i, as necessary. The external server 4 (4a to 4i) specifically illustrated in FIG. 2 is an example, and the present embodiment is not limited thereto.

The user terminal 1 is an information processing terminal which presents a happiness forecast to a user using information for displaying the happiness forecast transmitted from happiness management server 2. The user terminal 1 is not limited to a smartphone illustrated in FIGS. 1 and 2 but may be a mobile terminal such as a mobile phone terminal or a tablet terminal or a wearable terminal such as a smart watch, a smart band, smart eyeglasses, or a smart neck.

The schedule management server 4a has a function of registering schedule information (scheduled contents, a time, a place, and the like) transmitted from the user terminal 1 together with user information. Further, the schedule management server 4a has a function of presenting and editing the registered schedule information of the user in response to a user operation. The schedule information may be input by the user using the user terminal 1.

The lifelog management server 4b has a function of accumulating position information routinely transmitted from the user terminal 1 together with the user information and time information. The position information is acquired by a position information acquiring unit 120 of the user terminal 1 (see FIG. 3).

The communication server 4c has a function of sharing text or an image with a friend or an acquaintance. The user routinely transmits text or an image from the user terminal 1 to the communication server 4c, and the transmitted information is accumulated in the communication server 4c together with the user information and the time information and can be browsed by other users.

The program information provision server 4d has a function of providing information of television programs or Internet programs. The program information provision server 4d accumulates information such as a broadcast/delivery time, a title, a performer, and program contents as program information.

The audio management server 4e stores audio information transmitted from the user terminal 1 in association with the user information and the time information. The audio information is collected by a microphone 140 (see FIG. 3) of the user terminal 1. Further, the audio management server 4e has a function of accumulating audio information transmitted by the user for personal use and a function of causing the audio information to be shared with other users.

The image management server 4f accumulates image information (including a moving image) transmitted from the user terminal 1 in association with the user information and the time information. The image information is imaged by a camera 130 (see FIG. 3) of the user terminal 1. At this time, the user may tag an associated name to a subject recognized by face and object recognition of the image information. The image management server 4f stores the image information, tag information, the user information, and the time information in association with one another. Further, the image management server 4f has a function of accumulating the image information transmitted by the user for personal use and a function of causing the image information to be shared with other users.

The fan club management server 4g has a function of accumulating fan club membership information (a name, an address, an identification number, a telephone number, and the like) of a predetermined artist, an entertainer, or the like and performing information delivery via an e-mail, an SNS (social media), or the like periodically or irregularly.

The performance information management server 4h accumulates and delivers performance information (a date and time, a place, a performance title, a performer, performance contents, and the like) of a predetermined artist, an entertainer, or the like.

The rainbow information management server 4i accumulates information of a place and a time or the like at which a rainbow is expected to occur.

<2-2. Configuration of User Terminal>

Figure 3:
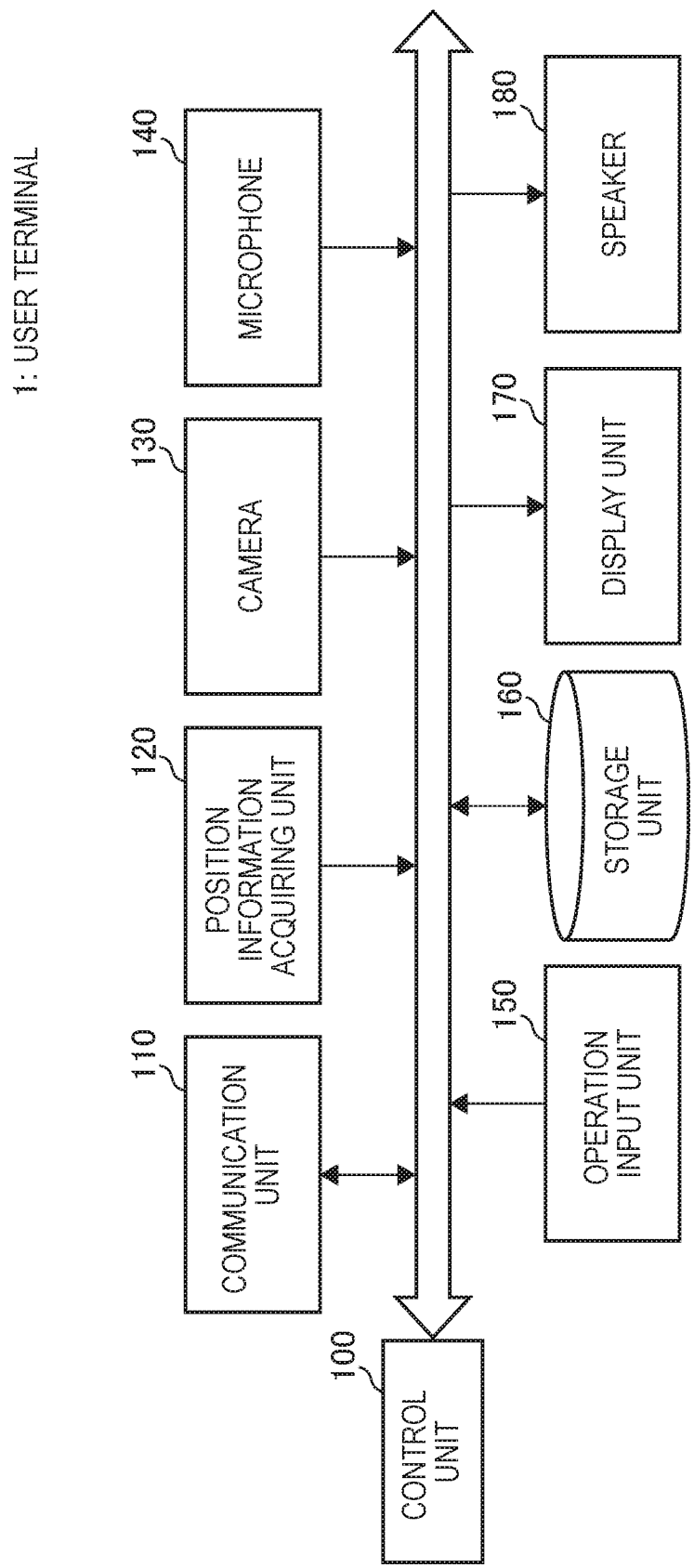
FIG. 3 is a block diagram illustrating a configuration example of a user terminal according to the present embodiment.

FIG. 3 is a block diagram illustrating a configuration example of the user terminal 1 according to the present embodiment. As illustrated in FIG. 3, the user terminal 1 includes a control unit 100, a communication unit 110, the position information acquiring unit 120, the camera 130, the microphone 140, an operation input unit 150, a storage unit 160, a display unit 170, and a speaker 180.

The control unit 100 functions as an operation processing device and a control device and controls an overall operation of the user terminal 1 in accordance with various kinds of programs. The control unit 100 is implemented by an electronic circuit such as a central processing unit (CPU) or a microprocessor, for example.

The communication unit 110 performs transmission and reception of data with an external device in a wired/wireless manner.

The position information acquiring unit 120 has a function of acquiring the position information of the user terminal 1. For example, the position information acquiring unit 120 may be a global positioning system (GPS) antenna and a GPS processing unit which processes GPS signals received through the GPS antenna. Alternatively, the position information acquiring unit 120 may be a Wi-Fi antenna which receives Wi-Fi (registered trademark) radio waves from a plurality of base stations and a position calculating unit which estimates a distance to each base station from a reception strength of a received Wi-Fi radio wave and calculates a current position on the basis of a principle of triangulation using a distance to each base station and a position of each base station.

The camera 130 images a surrounding area in accordance with a user operation and outputs captured image information to the control unit 100.

The microphone 140 collects an ambient sound in accordance with a user operation and outputs collected audio information to the control unit 100.

The operation input unit 150 is implemented by a touch panel, a switch, a button, or the like and detects an operation input by the user and outputs a detected input signal to the control unit 100.

The storage unit 160 is implemented by a read only memory (ROM) for storing a programs, an operation parameter, and the like used in a process of the control unit 100 and a random access memory (RAM) for temporarily storing an appropriately changing parameter and the like.

The display unit 170 is an example of an output unit and implemented by a display device such as a liquid crystal display (LCD) device, an organic light emitting diode (OLED) display device, or the like. For example, the display unit 170 displays the happiness forecast screen received from the happiness management server 2.

The speaker 180 is an example of an output unit and reproduces an audio signal. For example, the speaker 180 outputs the happiness forecast received from the happiness management server 2 as an audio.

<2-3. Configuration of Happiness Management Server>

Figure 4:
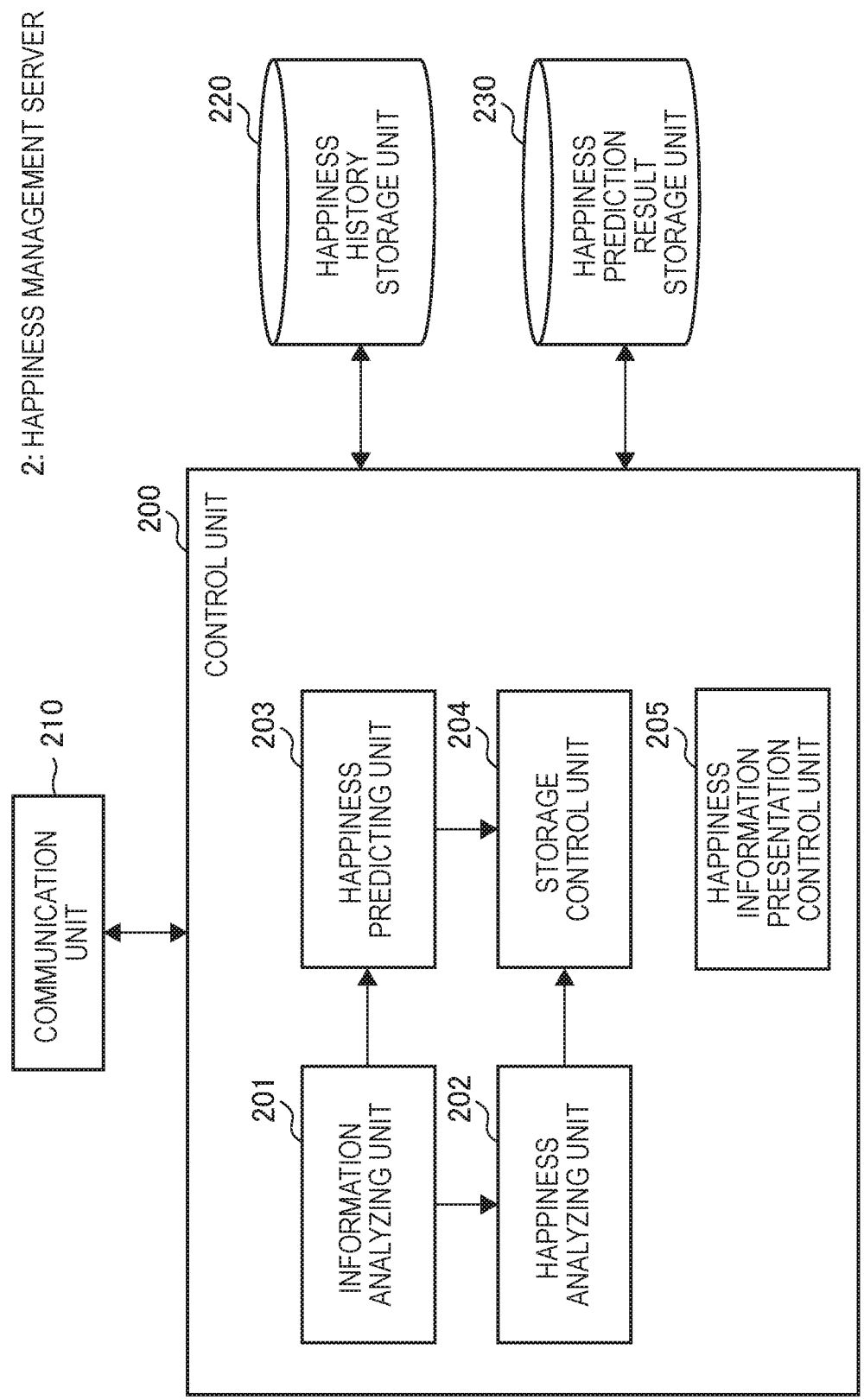
FIG. 4 is a block diagram illustrating a configuration example of a happiness management server according to the present embodiment.

FIG. 4 is a block diagram illustrating a configuration example of the happiness management server 2 according to the present embodiment. As illustrated in FIG. 4, the happiness management server 2 includes a control unit 200, a communication unit 210, a happiness history storage unit 220, and a happiness prediction result storage unit 230.

The control unit 200 functions as an operation processing device and a control device and controls an overall operation of the happiness management server 2 in accordance with various kinds of programs. The control unit 200 is implemented by an electronic circuit such as a CPU or a microprocessor, for example. Further, the control unit 200 functions as an information analyzing unit 201, a happiness analyzing unit 202, a happiness predicting unit 203, a storage control unit 204, and a happiness information presentation control unit 205.

The information analyzing unit 201 has a function of acquiring various information (including the behavior history of the user) for performing the happiness analysis from the external server 4 (4a to 4i) and the user terminal 1 and analyzing the acquired information. For example, in a case in which the external server 4 (4a to 4i) provides a web application programming interface (API) of calling data from another server, making inquiry about contents, and using the contents under the permission of the user, the information analyzing unit 201 checks whether or not new data is added to the external server 4 periodically (for example, once per hour) using the web API and acquires and analyzes the added data when the new data is added. Specifically, for example, the information analyzing unit 201 acquires post data of the user (an example of the behavior history of the user) from the communication server 4c and performs language analysis. Further, the information analyzing unit 201 acquires voice data of the user (an example of the behavior history of the user) from the audio management server 4e and performs emotion recognition and language analysis. Further, the information analyzing unit 201 acquires a lifelog of the user (an example of the behavior history of the user) from the lifelog management server 4b and performs behavior analysis of the user.

The happiness analyzing unit 202 determines whether or not happiness occurs in the user on the basis of information analyzed by the information analyzing unit 201 and calculates a strength of the happiness when the happiness occurs. For example, the happiness analyzing unit 202 calculates the happiness strength (for example, mapped to −1 to 1) in accordance with the presence or absence of the occurrence of happiness and a degree of smiling in accordance with smile recognition of a captured image. Further, in a case in which an angry face is recognized, the happiness analyzing unit 202 determines that a negative happiness occurs. Further, the happiness analyzing unit 202 analyzes text output by language analysis on the basis of e-mail contents of the user, SNS, or post data of a blog, and when the user has an emotion such as "joy" or "happy," it can be determined that happiness occurs. At this time, the happiness analyzing unit 202 can define a degree of happiness for each word indicating an emotion such as "joy" or "happy" in advance and calculate the happiness strength according to a definition. Further, the happiness analyzing unit 202 can also analyze an emotion on the basis of voice data of the user, determine the presence or absence of the occurrence of happiness, and calculate the happiness strength. The happiness analysis may be automatically performed on the basis of the analyzed information, but is not limited thereto; the user may also be able to input that the user is happy or the happiness strength. Further, the happiness analysis may be performed in real time or may be automatically analyzed later on the basis of accumulated captured images or voice data.

Further, the happiness analyzing unit 202 detects a keyword associated with the occurrence of happiness when the happiness occurs. For example, the keyword associated with the happiness is detected by machine learning. More specifically, means which causes the happiness (a conversation, watching of a television program, an e-mail, a telephone call, or the like), contents of the happiness (an event, a confronting person/object, a situation, or the like), a happiness occurrence place (including position information or an attribute of a place), and the like are assumed. The happiness analyzing unit 202 outputs the analyzed happiness occurrence date and time, a place, a happiness strength, and a user ID to the storage control unit 204 as analysis results together with the associated keyword. The happiness analyzing unit 202 may analyze an item carried by (or worn on) the user when the happiness occurs and may include the analyzed item in an analysis result (that is, a happiness history) as a happiness item.

The happiness predicting unit 203 predicts the happiness occurring in a specific place at a specific date and time on the basis of a relation between: at least one of a specific date and time, a specific place, and a keyword associated with a specific date and time and a specific place; and a happiness history (for example, a user ID, a date and time, a place, a happiness strength, a keyword, and the like) stored in the happiness history storage unit 220. For example, the happiness predicting unit 203 can predict that the happiness occurs on the basis of the happiness history in a case in which a similar keyword (for example, a concert of a predetermined entertainer is scheduled to be held, or the like) is associated with a specific date and time and a specific place on the basis of a time and place at which the happiness occurs and an associated keyword (for example, holding of a concert of a predetermined entertainer). Further, the happiness predicting unit 203 can calculate the happiness strength on the basis of the happiness history of people scheduled to gather at a specific place at specific date and time on the basis of the schedule information of a plurality of users and calculate the happiness strength of the place by summing up the happiness strengths.

In other words, in the present embodiment, since the happiness history is accumulated, it is possible to analyze a situation in which the happiness is likely to occur such as a situation in which there is a specific person, a situation in which there is a specific group, a certain time zone, a certain place, a situation in which a specific item is carried, or the like, and the happiness predicting unit 203 can analyze the happiness occurrence situation and perform the happiness prediction in a specific place at a specific date and time. Further, the analysis of the happiness occurrence situation may be performed on a rule basis, or a hidden relevance between the happiness and a situation may be extracted by machine learning or the like.

Further, when the happiness occurrence situation is analyzed, particularly, in a case in which a specific person, group, event, or object is mentioned as a factor for causing the happiness to occur, it can be regarded as propagating the happiness. Therefore, the happiness predicting unit 203 can also predict that the happiness will occur around a place at which there is a specific person, group, event, or object which propagates the happiness.

The storage control unit 204 accumulates the result analyzed by the happiness analyzing unit 202 in the happiness history storage unit 220 as the happiness history. Further, the storage control unit 204 accumulates the result predicted by the happiness predicting unit 203 in the happiness prediction result storage unit 230 as a happiness prediction result.

The happiness information presentation control unit 205 performs control such that the happiness information (that is, the happiness forecast) is presented to the user on the basis of the prediction result obtained by the happiness predicting unit 203. In a case in which a request from an external device (for example, the user terminal 1) requesting, for example, a happiness forecast in a specific place at a specific date and time is received through the communication unit 210, the happiness information presentation control unit 205 may generate the happiness forecast. More specifically, for example, the happiness information presentation control unit 205 generates a happiness forecast map image of a specified date and time and transmits information for displaying the generated image from the communication unit 210 to a request source via the network 3.

The communication unit 210 performs transmission and reception of data with an external device in a wired/wireless manner. For example, the communication unit 110 establishes a connection with the user terminal 1 via the network 3 and transmits information related to the happiness forecast.

The happiness history storage unit 220 stores the happiness history analyzed by the happiness analyzing unit 202. For example, a user ID, a happiness occurrence time, an end time, a happiness factor (means, contents, and a place) (an example of an associated keyword), a happiness strength, a happiness ID, and a possessed item (also referred to as "happiness item") are included in the happiness history. The happiness ID is identification information for managing the happiness occurred at the same "space" in common to a plurality of persons.

The happiness prediction result storage unit 230 stores the happiness prediction results predicted by the happiness predicting unit 203. For example, a place and time at which the occurrence of happiness is predicted, contents of happiness to occur, a happiness strength, and a possessed item are included in the happiness prediction results.

The configurations of user terminal 1 and the happiness management server 2 according to the present embodiment have been specifically described above. Next, an operation process according to the present embodiment will be described in detail.

<<3. Operation Process>>
<3-1. Happiness Analysis Process>

Figure 5:
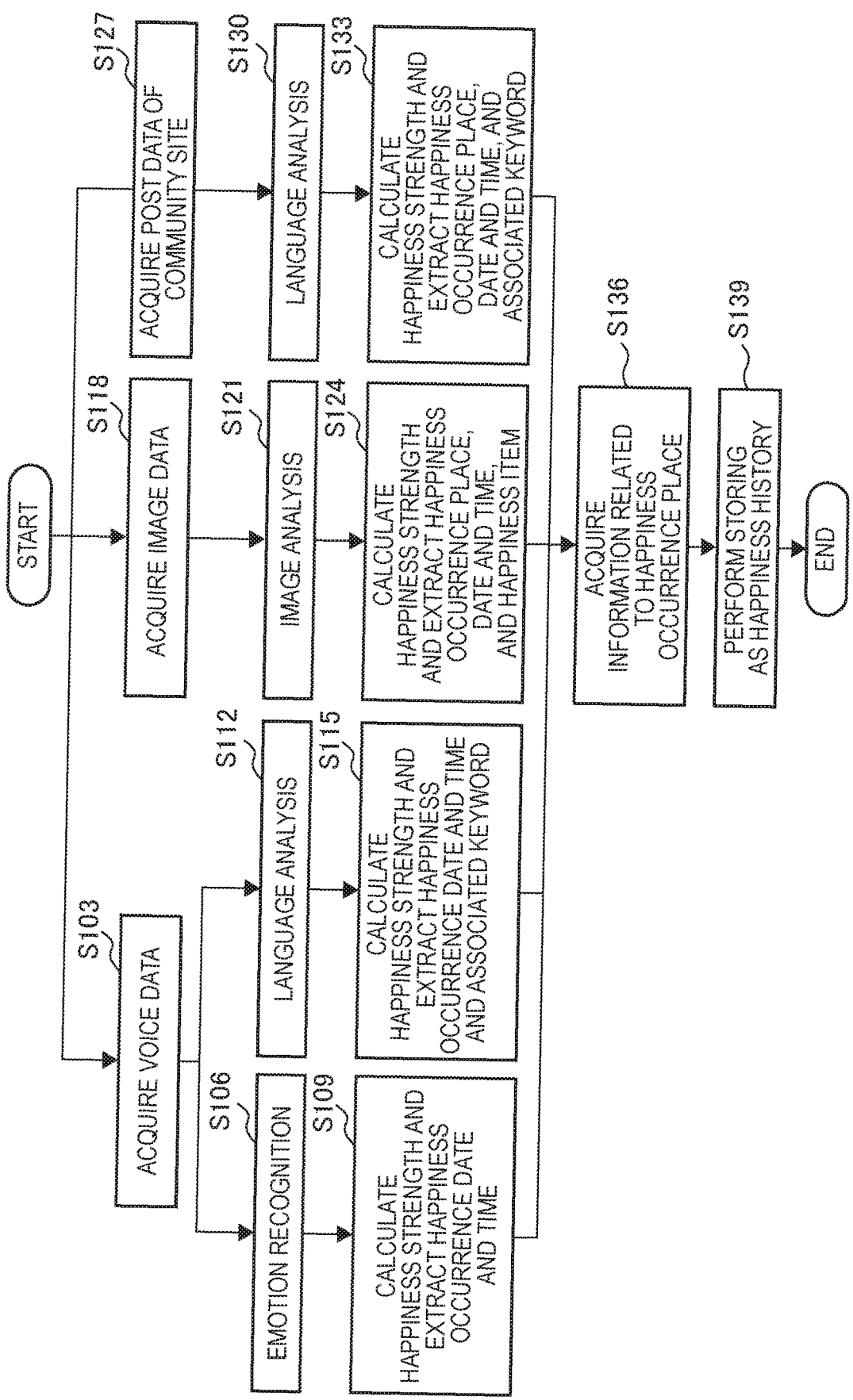
FIG. 5 is a flowchart illustrating a happiness analysis process according to the present embodiment.

FIG. 5 is a flowchart illustrating a happiness analysis process according to the present embodiment. As illustrated in FIG. 5, first, the happiness management server 2 acquires voice data of each user from the external server 4 (step S103). As described above, the happiness management server 2 checks whether or not new data is added to the external server 4, for example, once per hour, and acquires the added data in a case in which the new data is added. The voice data of each user is obtained by collecting, for example, a conversation, a cheer, or the like, and is acquired from the audio management server 4e.

Then, the information analyzing unit 201 performs the emotion recognition on the basis of the acquired voice data (step S106). For example, the information analyzing unit 201 extracts laughter, a tone of voice, or the like from the voice data and recognizes an emotion of a speaker (the user).

Then, the happiness analyzing unit 202 calculates the happiness strength (the size of an emotion such as "joy" or "happiness") of each user on the basis of the emotion recognition result (for example, calculates by performing normalization to −1 to 1) and extracts the happiness occurrence date and time (step S109).

Then, the information analyzing unit 201 performs the language analysis on the basis of the acquired voice data (step S112). For example, the information analyzing unit 201 converts the voice data into text and extracts a positive word (for example, "happy," "fun," "thank you," or the like) or a negative word (for example, "sad," "boring," "reluctant," or the like) in accordance with the language analysis on the text of the voice data.

Then, the happiness analyzing unit 202 calculates the happiness strength on the basis of the language analysis result and extracts a happiness occurrence date and time and an associated keyword (step S115). For example, the happiness analyzing unit 202 normalizes the happiness strength of the user, for example, to −1 to 1 on the basis of the extracted positive word or negative word and calculates the normalized happiness strength. Further, the happiness occurrence date and time are extracted from voice collection date and time information associated with the voice data. Further, the associated keyword relates to the happiness occurrence factor and can be extracted, for example, from the text of the voice data. For example, in a case in which voice data "The amusement park was fun! I want to go there again!" is acquired, the happiness strength is calculated from the positive word "fun," and "amusement park" is extracted as a keyword that is associated with the occurrence of happiness.

Then, the happiness management server 2 acquires the image data of each user from the external server 4 (step S118). The image data of each user is, for example, a captured image and is acquired from the image management server 4f. The captured image may include tag information associated with a subject.

Then, the information analyzing unit 201 performs the image analysis on the basis of the acquired image data (step S118). For example, the information analyzing unit 201 extracts a face image of the user himself/herself from the image data on the basis of the tag information and performs facial expression analysis.

Then, the happiness analyzing unit 202 calculates the happiness strength on the basis of a facial expression analysis result and extracts the happiness occurrence place and date and time and the possessed item (step S124). For example, in a case in which the facial expression of the user is a smile, the happiness analyzing unit 202 calculates the happiness strength in accordance with a degree of smiling. Further, the happiness occurrence place and date and time can be extracted from imaging place information and an imaging date and time included in metadata of the image data. Further, the possessed item is an item which is carried (or worn) by the user and one of the happiness occurrence factors, and can be extracted from object recognition of the image data or associated tag information.

Then, the happiness management server 2 acquires post data of a community site of each user from the external server 4 (step S127). The post data of each user is, for example, idle chatter, a diary, a comment, or a captured image and is acquired from the communication server 4c.

Then, the information analyzing unit 201 performs the language analysis on the basis of the acquired post data (step S130). For example, the information analyzing unit 201 performs the language analysis on the text included in the post data and extracts the positive word (for example, "happy," "fun," "thank you," or the like) or the negative word (for example, "sad," "reluctant," or the like).

Then, the happiness analyzing unit 202 calculates the happiness strength on the basis of the language analysis result and extracts the happiness occurrence place date and time and an associated keyword (step S133). For example, the happiness analyzing unit 202 normalizes the happiness strength of the user, for example, to −1 to 1 on the basis of the extracted positive word or negative word and calculates the normalized happiness strength. Further, the happiness occurrence place and date and time can be extracted from position information associated with the post data (current position information detected at the time of posting) and the post date and time information or contents of the post data. Further, the associated keyword relates to the happiness occurrence factor and can be extracted from the contents of the post data. For example, in a case in which post data "Artist X's concert was really awesome!" is acquired, the happiness strength is calculated from the positive word "awesome," and "artist X's concert" is the keyword related to the happiness occurrence.

Then, the happiness analyzing unit 202 acquires information related to a place at which the happiness occurs (or a "space" in which the happiness occurs) from each piece of data (step S136). For example, the place in which the happiness occurs may be obtained from the position information of the user at the happiness occurrence time on the basis of the lifelog of the user acquired from the lifelog management server 4b. For example, the information related to the happiness occurrence place may be extracted from the schedule information of the user acquired from the schedule management server 4a, the performance information acquired from the performance information management server 4h, or the program information acquired from the program information provision server 4d. Further, in a case in which a tag is added to a subject (a person or an object) other than the user in the captured image, it may be extracted as peripheral information of a person or an object associated with the happiness occurrence place.

Then, the storage control unit 204 performs control such that information related to the occurrence of happiness (the user ID, the happiness occurrence place, the information related to the occurrence place, the occurrence date and time, the happiness strength, the associated keyword, the item, or the like) analyzed by the happiness analyzing unit 202 is stored in the happiness history storage unit 220 as the happiness history (step S139).

The happiness analysis process according to the present embodiment has been described above. Next, a happiness forecast process using the happiness history accumulated by the happiness analysis process will be specifically described.

<3-2. Happiness Forecast Process for Unspecified Number of Persons>

Figure 6:
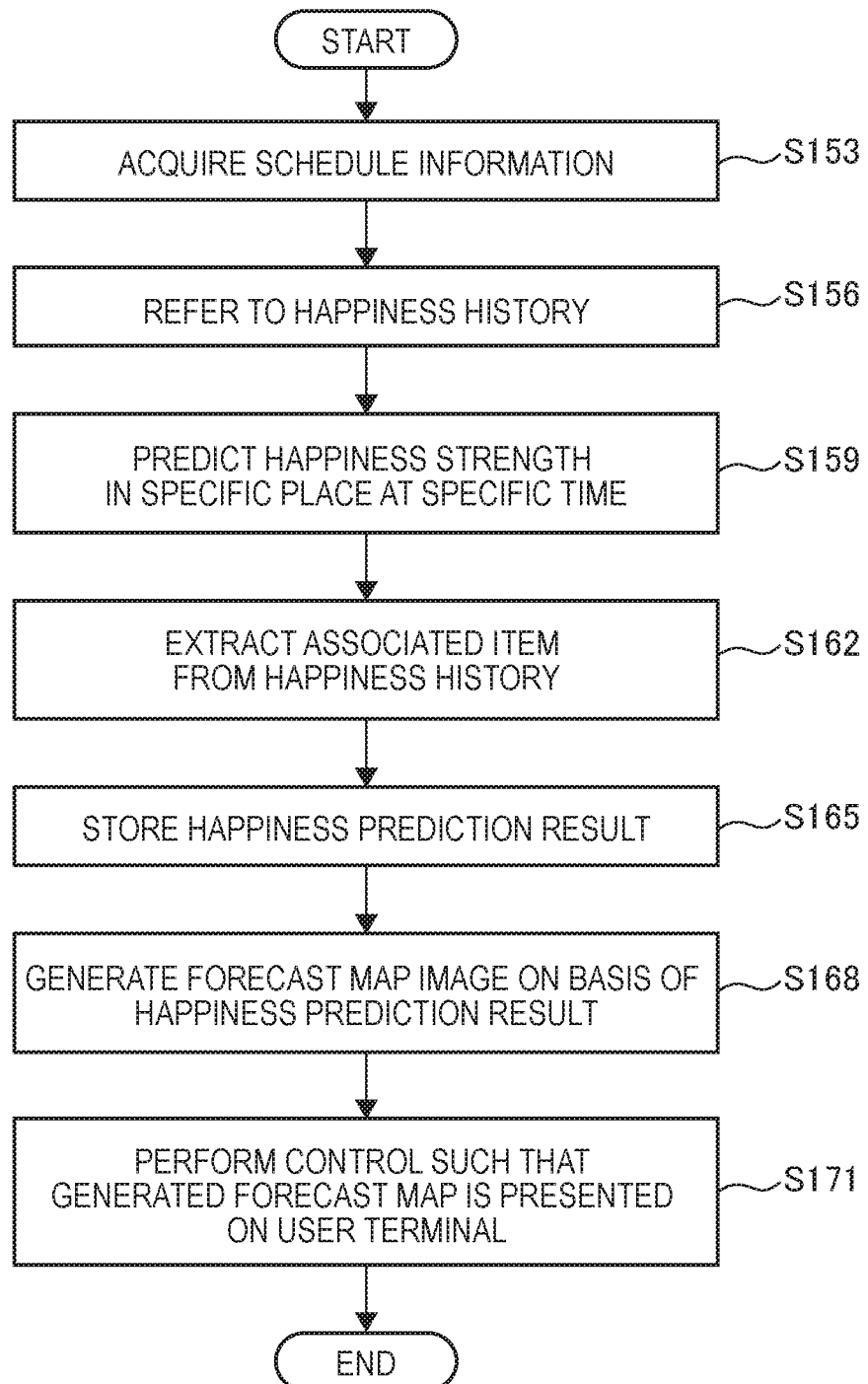
FIG. 6 is a flowchart illustrating a happiness forecast process for unspecified number of persons according to the present embodiment.

FIG. 6 is a flowchart illustrating the happiness forecast process for unspecified number of persons according to the present embodiment. As illustrated in FIG. 6, first, the happiness predicting unit 203 of the happiness management server 2 acquires the scheduled information of all the users from the schedule management server 4a (step S153).

Then, the happiness predicting unit 203 refers to the happiness history of all the users accumulated in the happiness history storage unit 220 (step S156).

Then, the happiness predicting unit 203 predicts the happiness strengths of all the users in a specific place at a specific time (step S159). For example, in a case in which tomorrow's happiness forecast for T city is output, the happiness predicting unit 203 first specifies the users who are scheduled to be in T city tomorrow on the basis of the schedule information of all the users. Then, the happiness predicting unit 203 calculates the daily or hourly happiness strengths of the specified users for tomorrow with reference to the happiness histories of the specified users. For example, the happiness predicting unit 203 extracts the happiness strength of the happiness history of each user related to a keyword associated with T city for all day tomorrow (for example, event information scheduled to be held in T city) on the basis of the happiness histories of the specified users, and predicts the happiness strengths of the specific users for all day tomorrow (for example, a value of the happiness strength of the user in the same event in the past, an average value, or the like). Then, the happiness predicting unit 203 sums up the daily or hourly happiness strengths of the specified users for tomorrow and outputs it as the daily or hourly happiness strength for T city tomorrow.

Then, the happiness predicting unit 203 extracts an item associated with the occurrence of happiness from the happiness history (step S162).

Then, the storage control unit 204 performs control such that the prediction result obtained by the happiness predicting unit 203 is stored in the happiness prediction result storage unit 230 (step S165).

Then, the happiness information presentation control unit 205 generates a forecast map image on the basis of the happiness prediction result (step S168), and performs control such that the forecast map image is transmitted through the communication unit 210 in order to cause the generated forecast map image to be presented to the user through the user terminal 1 (step S171). Accordingly, the user can browse, for example, the happiness forecast for T city tomorrow and know tomorrow's happiness occurrence situation in advance.

<3-3. Happiness Forecast Process for Specific Community>

In the above embodiment, the happiness forecast is a forecast for unspecified number of persons (general public) because the forecast map image is generated on the basis of the happiness prediction for all the users, but the present disclosure is not limited to such an example. For example, it is possible to implement a happiness forecast for a specific community by limiting a happiness prediction target. For example, users of a specific community are specified by extracting similar users whose preferences are similar to one another. A specific description will proceed below with reference to FIGS. 7 to 19.

Figure 7:
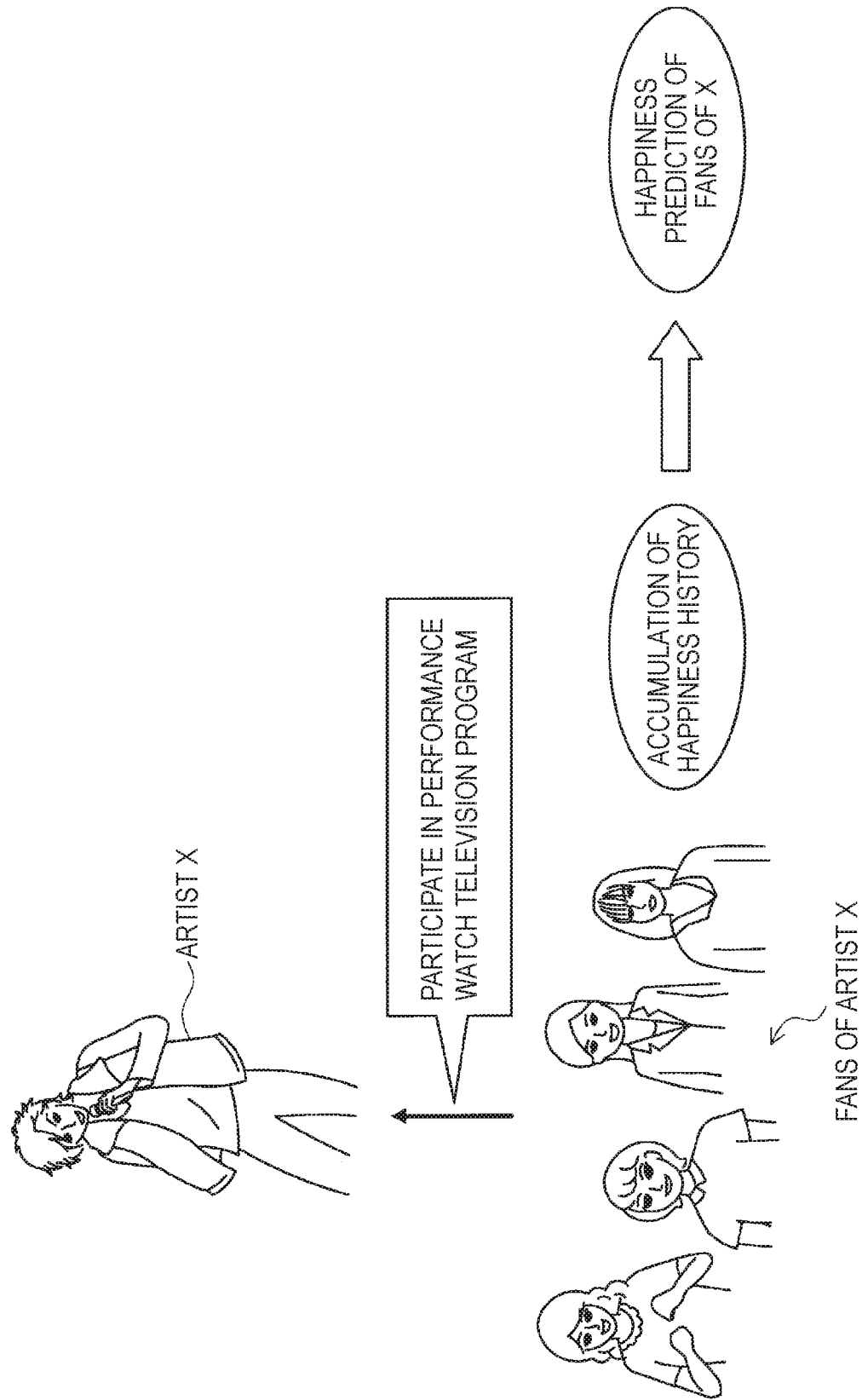
FIG. 7 is a diagram for describing a happiness forecast for a specific community according to the present embodiment.

FIG. 7 is a diagram illustrating a happiness forecast for a specific community according to the present embodiment. As illustrated in FIG. 7, for example, it is also possible to perform happiness prediction for a specific community such as fans of an artist X using a happiness history in which happiness caused when fans of the artist X (for example, fan club members) regularly watch a television program in which the artist X appears, participate in a performance (for example, a concert), or buy goods is accumulated.

(Accumulation of Happiness History)

When the happiness forecast for the specific community is performed, for example, the happiness predicting unit 203 may acquire the happiness histories of the users who are in the fan club from the happiness history storage unit 220 on the basis of fan club membership data acquired from the fan club management server 4g, and use the acquired the happiness histories for the happiness prediction. Here, happiness analysis and a happiness history example of the users included in the specific community such as fans of the artist X will be described with reference to FIGS. 8 to 9.

For example, it is assumed that a user A is a fan of the artist X, usually checks a television program of the artist X and goes to the artist X's concert, a concert schedule of the artist X is included in a schedule of the user A, and a photograph of the user A captured with a smile before and after the concert is included in a history of a captured image. If the user A posts a topic related to the artist X such as "X's live! I am very happy!" to the communication server 4c in an SNS, it is acquired by periodical checking of added data by the happiness management server 2, and the language analysis is performed (see steps S127 to S130 of FIG. 5). Since the happiness analyzing unit 202 detects that the user A shows the positive reaction "I am very happy" in the topic associated with the artist X as a result of analysis, the happiness analyzing unit 202 calculates the happiness strength, for example, using a happiness coefficient table illustrated in FIG. 8. In the happiness strength definition table illustrated in FIG. 8, happiness strengths corresponding to language expressions are defined in advance, and for example, "Want to go but cannot go: happiness strength −0.2," "A little happy: happiness strength 0.2," "Happy!: happiness strength 0.5," "Very happy. Happy!! Super happy!: happiness strength 0.8." In this case, the happiness analyzing unit 202 calculates the happiness strength 0.8 from the expression "Very happy" extracted from the language analysis on the post data of the user A. The happiness analyzing unit 202 further acquires a date and time of the post data and a current position of the user A at the time of posting, and stores them in the happiness history storage unit 220 as the happiness history by the storage control unit 204. Here, FIG. 9 illustrates an example of the happiness history according to the present embodiment. The happiness history based on the analysis result for the post data is illustrated in the first row of FIG. 9.

Further, it is assumed that, when the user A is watching a television program in which the artist X is scheduled to appear on another day, a smile shown at a moment at which the artist X appears is imaged using a viewer observation camera installed in a television, or the user A captures a photograph in which his/her face and a video of the artist X appear in the television and uploads the captured image onto the image management server 4f. Further, the user A is also assumed to add a tag (specifically a tag indicating a name of each person) to the user and the artist X shown in the image captured by the user and then upload it to the image management server 4f. Then, the captured image is acquired from the image management server 4f by periodical checking of added data by the happiness management server 2, and the image analysis is performed (see steps S118 to S121 of FIG. 5). The happiness analyzing unit 202 calculates the happiness strength (for example, the happiness strength 0.7) from the degree of smiling of the face of the user A shown together with the artist X or the face of the user A when the artist X appears, in accordance with the facial expression analysis for the user A shown in the captured image. The happiness analyzing unit 202 may acquire information of a program watched by the user from the program information provision server 4d on the basis of the imaging time and extract performer information and the like. The happiness analyzing unit 202 further acquires the date and time of the captured image and the current position of the user A at the time of imaging and store them in the happiness history storage unit 220 as the happiness history by the storage control unit 204. The happiness history of the user A at the time of viewing the television program is illustrated in a second row of FIG. 9.

On the other hand, since it is known that the artist X recorded the program two days ago from the schedule information of the artist X who is a performer, the happiness analyzing unit 202 may assign the same happiness ID as the happiness strength of the user A when the same television program is watched to the happiness strength of the artist X at the time of recording as the happiness that has occurred in the "space" of the same television program, and accumulate it as the happiness history. For example, the happiness strength of the artist X at the time of recording may be calculated in accordance with smile recognition for a captured image in which the artist X photographed himself/herself during the program recording. The happiness history of the artist X is illustrated in a third row of FIG. 9.

Since the happiness history is accumulated on a daily basis as described above, it is inferred (by the happiness predicting unit 203) that a proportion related to the artist X in the occurrence of happiness of the user A is large, and a correlation between the happiness of the user A and the artist X is high.

Further, since the artist X is popular, there are a user B and a user C whose happiness with a high correlation with the artist X is accumulated similarly to the user A, and for example, the same happiness ID is assigned to the happiness occurring when the same television program in which the artist X appears is watched. The happiness histories of the user B and the user C are illustrated in fourth and fifth rows in FIG. 9.

Further, the user A, the user B, and the user C who live in T city know that the next performance of the artist X will be held in O city away from T city. Here, each of the users comments in the SNS as follows, the comments are acquired by periodical checking of added data by the happiness management server 2, and language analysis is performed.

User A "O city performance of X, wow! I will definitely go!"

User B "O city performance of X, great! I will definitely go!"

User C "O city performance of X . . . , I want to go but cannot make it due to work."

(Happiness Prediction)

Next, the happiness prediction process for the specific community (here, fans of the artist X) will be described with reference to FIG. 10.

Figure 10:
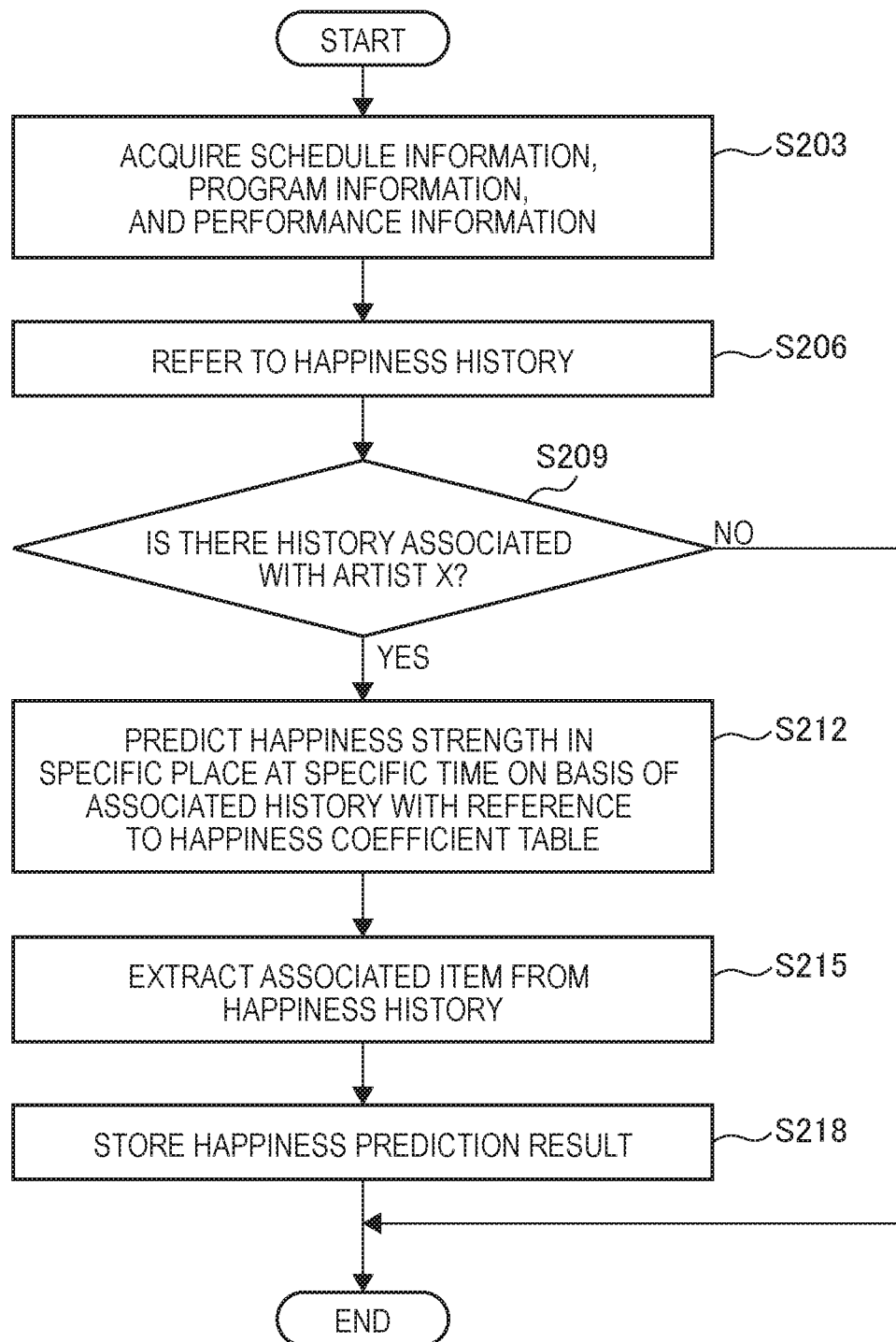
FIG. 10 is a flowchart illustrating happiness prediction process for a specific community according to the present embodiment.

As illustrated in FIG. 10, first, the information analyzing unit 201 acquires the schedule information of the fans of the artist X, the program information, the performance information, and the like from the schedule management server 4a, the program information provision server 4d, and the performance information management server 4h (step S203). Here, the information associated with the happiness of the fans of the artist X, that is, the event information related to the artist X is acquired. Further, the information analyzing unit 201 analyzes the acquired information. Specifically, for example, information indicating participation in an event associated with the artist X is extracted from the schedule information, the performance information of the artist X is extracted from the performance information, and the program appearance information of the artist X is extracted from the program information.

Then, the happiness predicting unit 203 refers to the happiness history of each the user (the fans of the artist X) (step S206).

Then, the happiness predicting unit 203 checks whether or not there is a history associated with the artist X in the happiness history (step S209), and in a case in which there is an associated history (Yes in step S209), the happiness predicting unit 203 calculates (that is, predicts) the happiness strength of the user in a specific place at a specific time on the basis of the associated history (step S212). For example, in a case in which the happiness strength of the user A when watching a previous television program in which the artist X appears is "0.8," the happiness predicting unit 203 predicts that the happiness strength is "0.8" also when watching a next television program in which the artist X appears.

Further, the happiness predicting unit 203 acquires performance schedule data of the artist X from the performance information, and when the O city performance of the artist X is detected to be held on May 20, 2015, the happiness predicting unit 203 predicts that the fans of the artist X are highly likely to have the happiness on May 20. The happiness predicting unit 203 checks schedules of May 20 of the user A, the user B, the user C, and the like who are the fans of the artist X with the schedule information of the users and is able to calculate the happiness strength of the fans of the artist X in the O city on May 20 on which the performance is held by predicting and summing up the happiness of each user on May 20. The schedule of each user related to the performance of the artist X on May 20 is extracted from the schedule information or the post data of the SNS, and it is possible to detect a participation situation of each user in the performance.

Here, the happiness predicting unit 203 is able to calculate a prediction value of the happiness strength by multiplying the happiness strength of the user when watching the previous television program in which the artist X appears by the happiness coefficient corresponding to the situation of the user with reference to the happiness coefficient table illustrated in FIG. 11. The happiness coefficients illustrated in FIG. 11 are coefficients which differ depending on a situation (for example, an event) of the user, and for example, the happiness coefficient is "−0.1" in a case in which meeting is not possible (for example, it is unable to participate in or unable to watch the program), "1" in a case in which the user watches the television program, "1.5" in a case in which the user participates in public viewing (indicating a live broadcast of the concert in a movie theater), "2" in a case in which the user participates in the concert, "3" in a case in which the user participates in a signing event or the like. In the present embodiment, since the happiness strength is normalized to −1 to 1, in a case in which the calculated prediction value exceeds −1 to 1, a limiter may be set so that "−1" and "1" are the maximum values of positive and negative values.

Further, the happiness predicting unit 203 extracts an item associated with the occurrence of happiness to be predicted from the happiness history (step S215). The item associated with the occurrence of happiness is an object that is one of factors which cause certain happiness. For example, in the example of the concert, in the concert of the artist X, a situation in which everyone shakes a glow stick while singing exciting songs is analyzed on the basis of the post data of the SNS, the captured image of a person returning from the concert, or the like, and "item: glow stick" is registered in the happiness history in advance. An example of such a happiness history is illustrated in FIG. 12A. FIG. 12A illustrates an example of the happiness history in the T city performance of the artist X performed in the past, and the happiness predicting unit 203 is able to determine that the happiness is occurring at a high probability together with the glow stick in the concert of the artist X on the basis of this happiness history. In this case, the happiness predicting unit 203 can extract the "glow stick" as an item associated with the happiness of the fans of the artist X caused by the concert.

The happiness prediction result obtained by the happiness predicting unit 203 is accumulated in the happiness prediction result storage unit 230 (step S218). FIG. 12B is a diagram illustrating an example of the happiness prediction result. FIG. 12B illustrates the happiness strength prediction values of the users (may include the artist X) during 18:30 to 21:00 (the performance time of the artist X) on May 20, 2015. The same happiness ID is assigned, because the happiness occurs in the concert which is the same "space."

(Happiness Prediction Presentation Process)

Next, the presentation of the happiness prediction result to the user will be described with reference to FIGS. 13 to 19. For example, an image in which the happiness strength of a specific population in each place is indicated by a heat map may be presented to the user as the happiness prediction result in view of a place.

FIG. 13 is a flowchart illustrating a process of presenting the happiness prediction result according to the present embodiment. As illustrated in FIG. 13, first, the happiness information presentation control unit 205 of the happiness management server 2 selects the population of the happiness forecast (step S223). Here, for example, the fans of the artist X are selected. Specifically, the fans of the artist X are selected as the population of the happiness forecast with reference to the fan club membership data of the artist X supplied from the fan club management server 4g or the preference of each user (for example, the preference inferred on the basis of the happiness history or previously registered user information).

Then, the happiness information presentation control unit 205 acquires the happiness prediction result of the user corresponding to the population from the happiness prediction result storage unit 230 (step S226).

Then, the happiness information presentation control unit 205 generates the forecast map image on the basis of the acquired happiness prediction result (step S229). A specific example of the forecast map image according to the present embodiment will be described later.

Then, the happiness information presentation control unit 205 performs control such that the generated forecast map is presented to the user through the user terminal 1 (step S232). Accordingly, for example, the user can understand the happiness strength of the fans of the artist X at each place in advance at a concert start time of the artist X on May 20. Note that the happiness information presentation control unit 205 can similarly generate the heat map image indicating the previous happiness strength using the happiness history stored in the happiness history storage unit 220.

(Display Example of Happiness Prediction)

Figure 14:
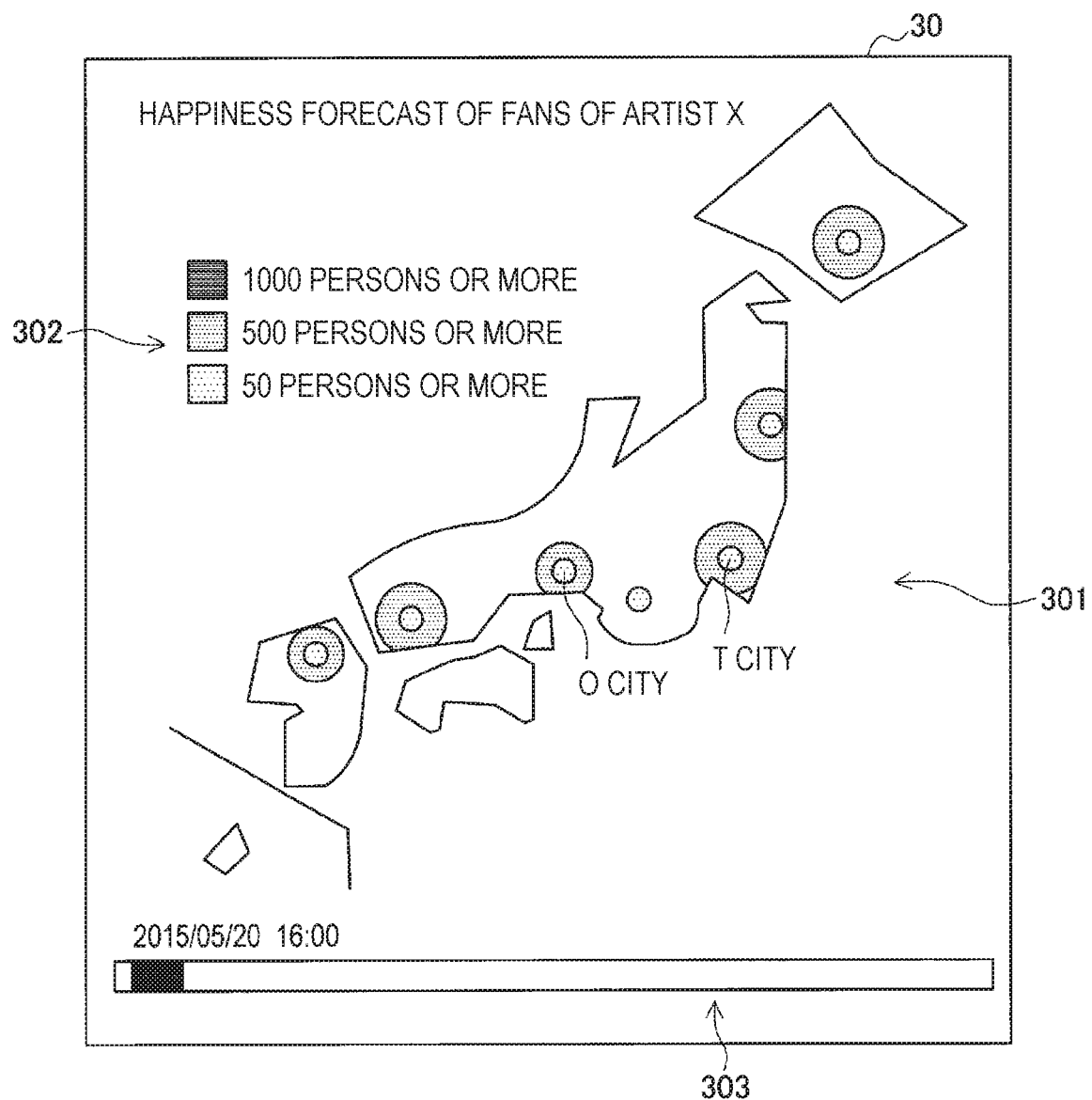
FIG. 14 is a diagram illustrating a screen display example of a happiness forecast of fans of an artist X according to the present embodiment.

Next, a display example of the happiness prediction according to the present embodiment will be specifically described. FIG. 14 is a diagram illustrating a screen display example of the happiness forecast according to the present embodiment. In the illustrated example, a heat map of the happiness forecast of the fans of the artist X at 16:00 on May 20, 2015 is displayed on a screen 30. In a heat map 301 illustrated in FIG. 14, for example, the number of fans gathered in each place whose happiness strength is higher than a predetermined threshold value (for example, 0.5) is indicated by a contour (see legends 302). For example, in a case in which the concert of the artist X starts in the O city at 18:30 on May 20, and the public viewing of the concert (the live broadcast of the concert in a movie theater or a playing field) is scheduled to be held nationwide, the fans of the artist X are expected to move to a hall while having the happiness due to the expectation of concert from a few hours before the start of the concert. A moving schedule of the user can be acquired from the schedule information. Therefore, as illustrated in FIG. 14, at a time point of 16:00 prior to the start of the concert, many users with the high happiness values are predicted to move toward each hall and gather at the hall, and the user can understand excitement around the hall before the concert by looking at the screen 30. Further, the user can change a predicted time zone in which prediction is displayed by operating a time slider 303 included in the screen 30.

Figure 15:
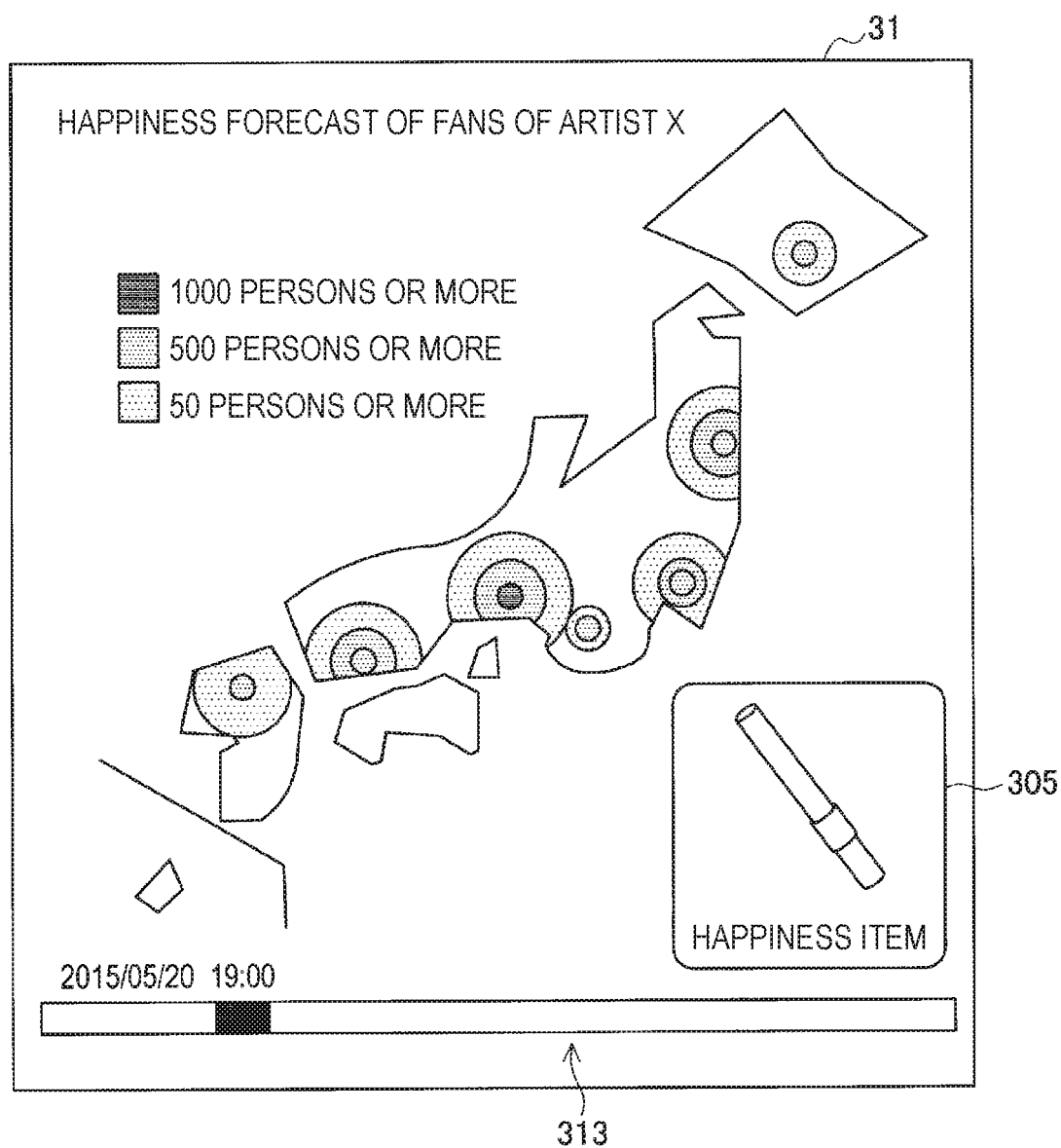
FIG. 15 is a diagram illustrating a screen transition example of a happiness forecast illustrated in FIG. 14.

FIG. 15 is a diagram illustrating a screen transition example of the happiness forecast illustrated in FIG. 14. In a screen 31 of FIG. 15, a time slider 303 is operated by the user, and the happiness forecast at a time point of 19:00 (during the performance) after the start of the concert is displayed. Accordingly, the user is able to visually easily understand gatherings of people that the happiness of the fans of the artist X is high in and around the halls in the country in which the concert is held. For example, in FIG. 15, circles each having a size corresponding to a predetermined radius centered on each hall are indicated by a color corresponding to the number of people with the high happiness strength and being present within the predetermined radius from each hall. A happiness item image 305 is also displayed on the screen 31. Accordingly, the user is able to understand that the happiness (excitement) further increases when the user goes to the hall with the glow stick shown in the happiness item image 305.

Figure 16:
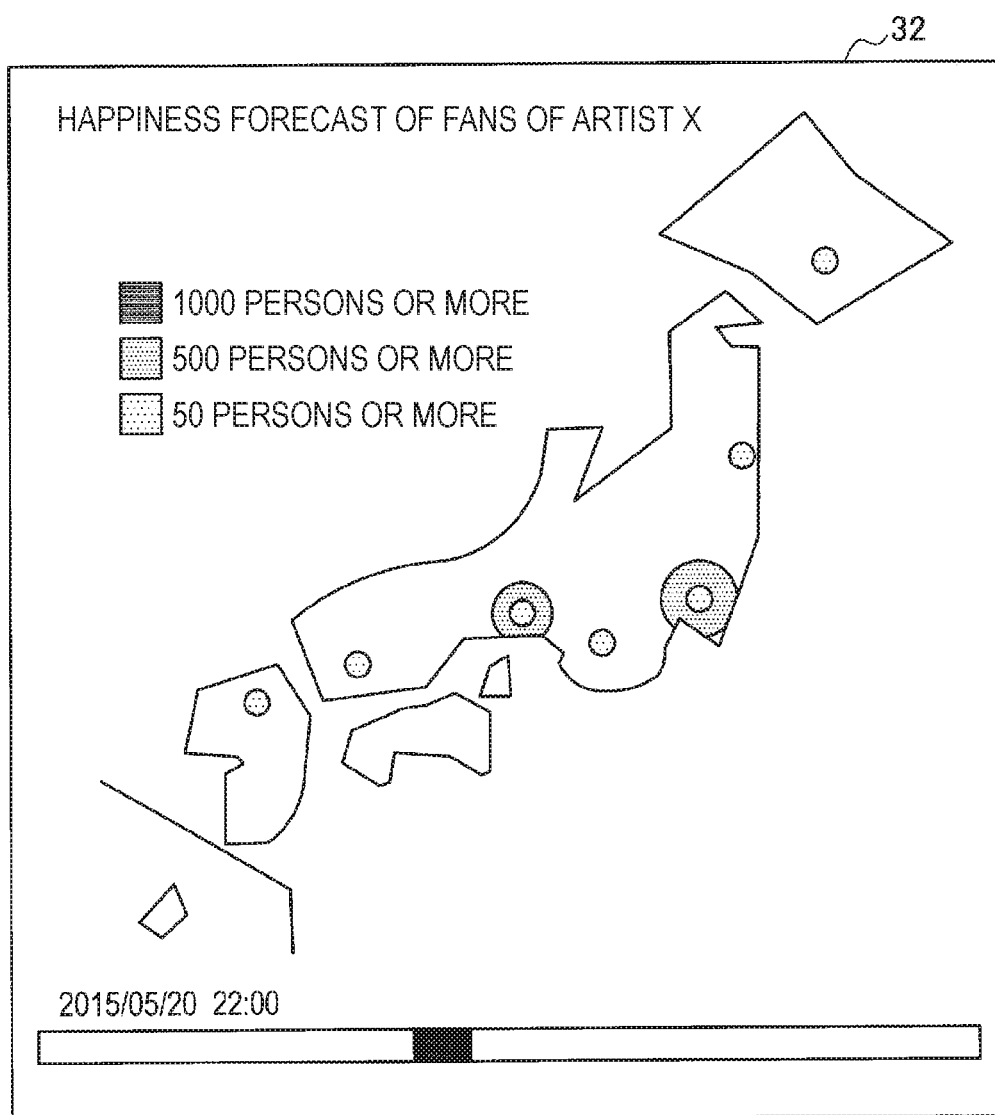
FIG. 16 is a diagram illustrating a screen transition example of a happiness forecast illustrated in FIG. 15.

FIG. 16 is a diagram illustrating a screen transition example of the happiness forecast illustrated in FIG. 15. In a screen 32 of FIG. 16, the time slider 313 is operated by the user, and the happiness forecast at of a time point of 22:00 after the concert ends is displayed. Accordingly, the user is able to visually easily understand a state in which people that the happiness of the fans of the artist X is high are leaving in and around the halls in the country after the concert ends.

In FIGS. 14 to 16, the example of changing the time zone in the same day in which prediction is displayed has been described, but the present embodiment is not limited thereto, and for example, in the case of a national tour of the artist X, it is possible to cause the predictive display screen to transition to a day in which another concert is held and enjoy a forecast for how the happiness moves and how people with the high happiness strength increases or decreases as the days go by.

Figure 17:
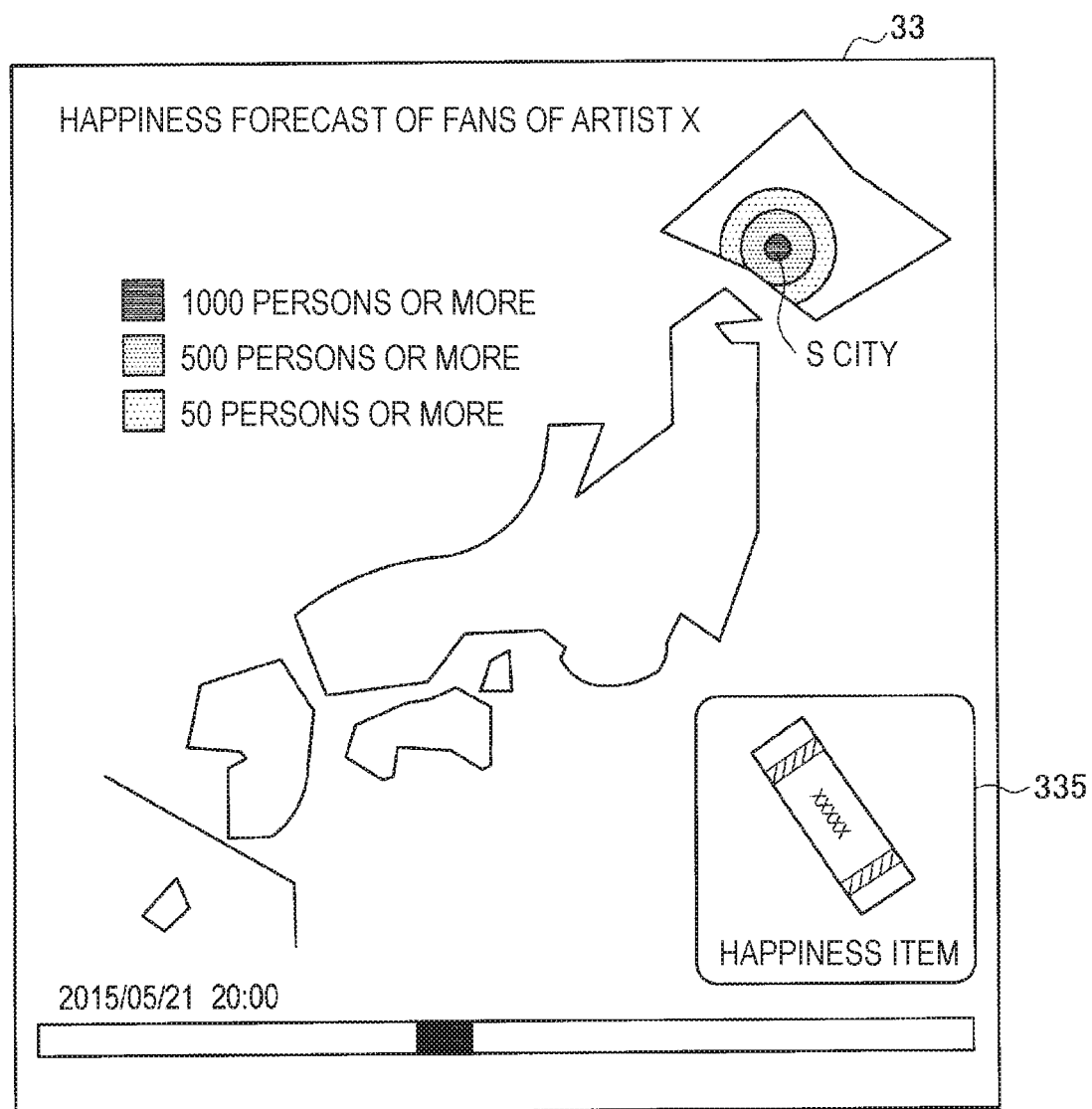
FIG. 17 is a diagram illustrating a screen display example of a happiness forecast of fans of an artist X on a day after a concert according to the present embodiment.

FIG. 17 is a diagram illustrating a screen display example of the happiness forecast of the fans of the artist X on the next day of the concert. A forecast in which the happiness of the fans of the artist X occurs in an S city in which an event of the artist X has not been held is displayed on a screen 33 of FIG. 17. Since some of the fans of the artist X are fans of an artist Y, and there is performance of the artist Y in the S city on the next day of the concert of the artist X, the happiness caused by the performance of the artist Y is predicted. Further, since the fans are often excited while swinging the towel in the performance of the artist Y, a happiness item image 335 in which the towel is shown as the happiness item is displayed on a screen 33 together. Thus, it is understood that the fans of the artist X are interested in the artist Y, and the happiness occurs, and the artist Y camp are able to acquire new fans. Further, the fans of the artist X can know in advance that there is performance of the artist Y whom many of the same fans as them are interested in and the happiness item. Further, the user may give an instruction to change the population of the happiness forecast from the user terminal 1 to the happiness management server 2 so that, for example, the user can cause the happiness forecast for the unspecified number of persons, the happiness forecast for the fans of the artist X, and the happiness forecast for the fans of the artist X and the fans of the artist Y, to be displayed in a comparison manner.

Further, the display method of the happiness forecast according to the present embodiment is not limited to the heat map image display corresponding to the number of people with the high happiness strength as described above, and may be a heat map image display according to the happiness strength of each place (a sum value of the happiness strengths of people of a specific community scheduled to visit each place).

Figure 18:
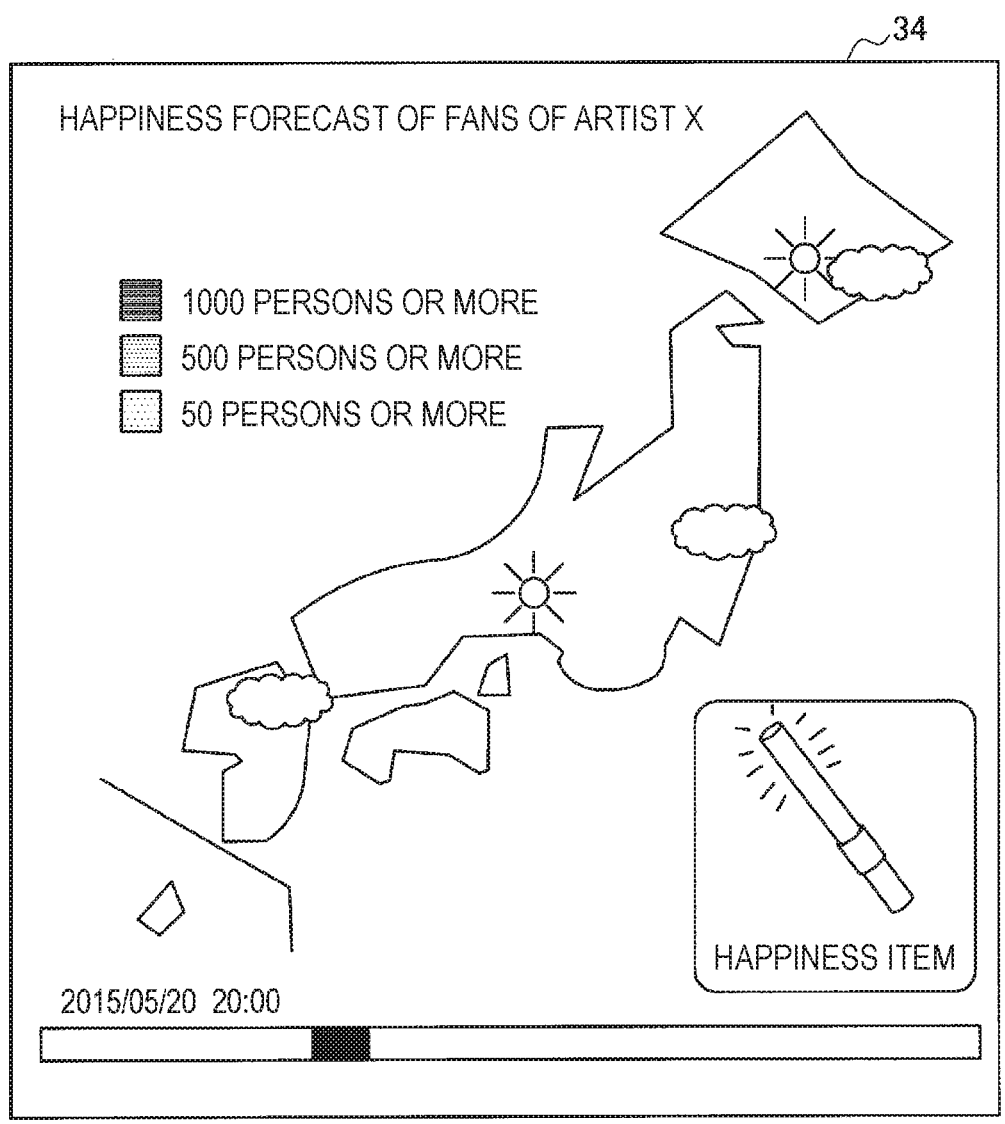
FIG. 18 is a diagram illustrating a screen display example in a case in which a happiness forecast according to the present embodiment is expressed similarly to a national weather forecast.

Further, in the display method of the happiness forecast according to the present embodiment, weather icons corresponding to the happiness strength may be mapped and expressed similarly to the weather forecast. FIG. 18 is a diagram illustrating a screen display example in a case in which the happiness forecast according to the present embodiment is expressed similarly to the national weather forecast. In the illustrated example, a map image in which weather icons (for example, a sunny icon, a cloudy icon, and a rainy icon) corresponding to the sum values of the happiness strengths of the fans of the artist X in respective places are mapped is displayed on a screen 34. Here, for example, the happiness strength 1 to 0.5 is indicated by the sunny icon, the happiness strengths 0.5 to −0.5 are indicated by the cloudy icon, and the happiness strengths −0.5 to −1 are indicated by the rainy icon (not illustrated).

Figure 19:
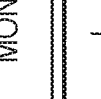
FIG. 19 is a diagram illustrating a screen display example in a case in which a happiness forecast according to the present embodiment is expressed similarly to a weekly weather forecast.

FIG. 19 is a diagram illustrating a screen display example in a case in which the happiness forecast according to the present embodiment is expressed similarly to the national weather forecast. In the illustrated example, the weather icons (for example, the sunny icon, the cloudy icon, and the rainy icon) corresponding to the sum values of the happiness strengths of the fans of the artist X in respective cities are displayed on a screen 35 for each day of the week. Accordingly, for example, the user is able to understand the transition of the happiness strength of the fans of the artist X in cities across the country during a week of tours. In the example illustrated in FIG. 19, the happiness forecast is displayed on a time axis of one week, but the present embodiment is not limited to such an example, and the happiness forecast of one day may be displayed using the weather icons at intervals of hours, or the overall happiness forecast of one day may be displayed using the weather icons.

Further, the display method of the happiness forecast is not limited to an example using the above-described charts, and the transition of the happiness forecast may be briefly described using a sentence. For example, text such as "the concert of the artist X will be held in the T city today, so that the happiness strength in N km radius will be stronger from 2 hours before the concert" is displayed on the user terminal 1 and presented to the user.

Further, many of the screen display examples described above can also be applied to the display of the happiness forecast for the unspecified number of persons described above.

<3-4. Personal Happiness Forecast Process>

Next, it is also possible to limit the happiness prediction target (that is, the population of the happiness forecast) and perform the personal happiness forecast for the user. A specific description will proceed below with reference to FIGS. 20 to 24.

Here, a case of performing the person happiness forecast for the user A will be described. In a case in which the user A uploads post data such as "I saw a rainbow! It was exciting to see the rainbow," the happiness analyzing unit 202 of the happiness management server 2 analyzes that the user A has the happiness due to the rainbow topic on the basis of the post data and accumulates an analysis result as the happiness history. Here, an example of the happiness history of the user A is illustrated in FIG. 20. In the illustrated example, the happiness strength 0.7 is calculated, for example, from an expression "exciting" in accordance with the language analysis on the post data of the user A of the SNS and registered in a first row. Further, on another day, the user A writes "I saw the rainbow again. I was excited. I took a picture by a camera." on the SNS, and similarly, the happiness management server 2 acquires the post data and performs the language analysis. Then, the happiness analyzing unit 202 calculates the happiness strength 0.8 on the basis of the expression "I was excited," for example, and it is registered in a second row of the happiness history of FIG. 20. Further, at this time, the camera is extracted as the happiness item and registered.

Figure 21:
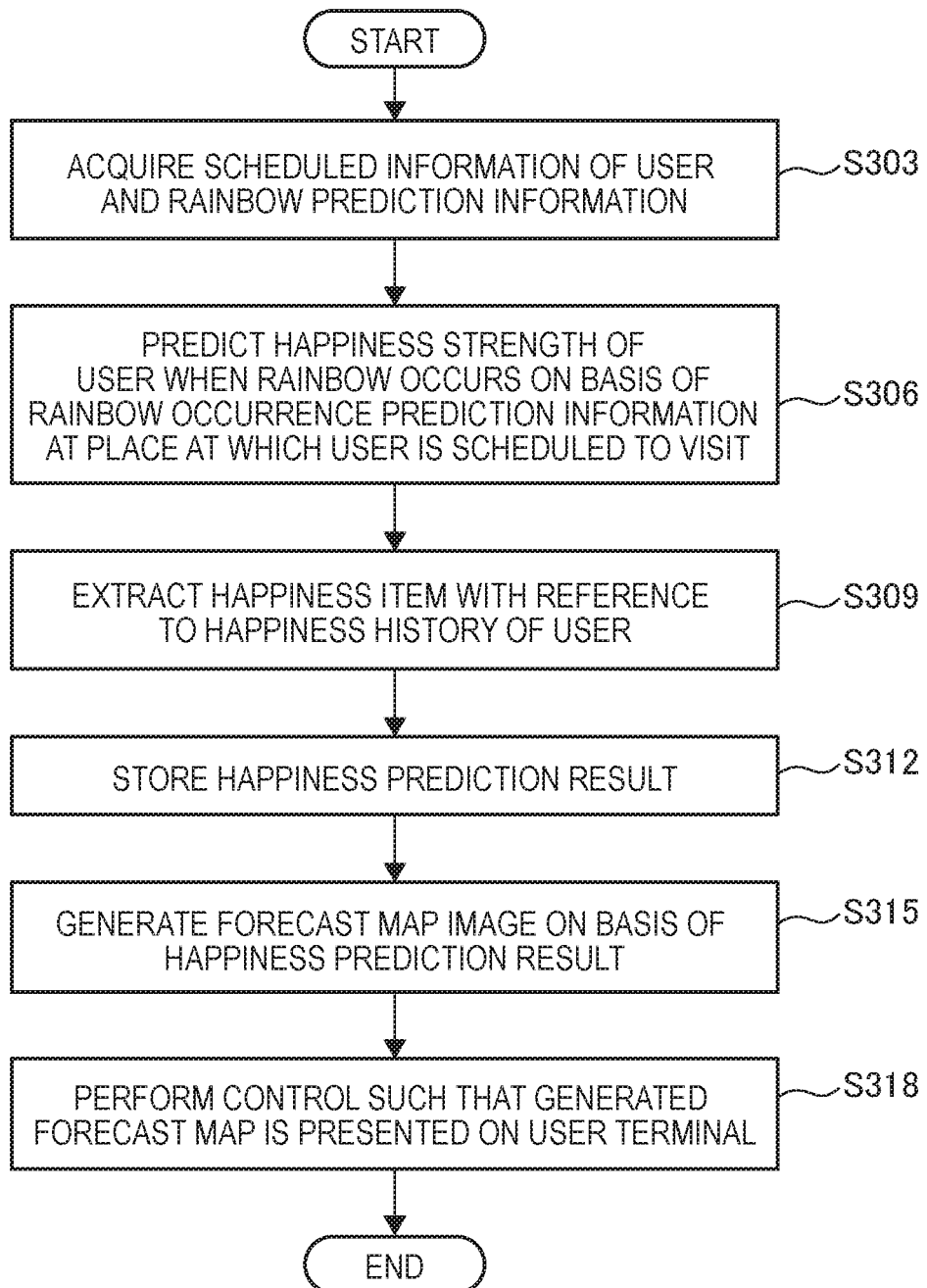
FIG. 21 is a flowchart illustrating a personal happiness forecast process of a user according to the present embodiment.

Next, the personal happiness forecast process for the user A will be described with reference to FIG. 21. FIG. 21 is a flowchart illustrating the personal happiness forecast process for the user according to the present embodiment.

As illustrated in FIG. 21, first, the happiness management server 2 acquires the schedule information of the user and rainbow prediction information from the schedule management server 4a and the rainbow information management server 4i (step S303). The rainbow information management server 4i implements a service of predicting where and when a rainbow occurs on the basis of weather information or the like, accumulates the prediction information, and provides the prediction information to the user as necessary.

Then, the happiness predicting unit 203 predicts the happiness strength of user when the rainbow occurs on the basis of rainbow occurrence prediction information at a place and time at which the user A is scheduled to visit (step S306). For example, the happiness predicting unit 203 acquires information indicating that the user A is scheduled to go to the Y city around 15:00 today on the basis of the schedule information of the user and also refers to the rainbow occurrence information in the Y city around 15:00 today if the "rainbow" is inferred to be associated with the happiness of the user A with reference to the happiness history of the user A. Then, in a case in which the rainbow is likely to occur, the happiness predicting unit 203 predicts that the user A is likely to see the rainbow and have the happiness, and calculates the happiness strength prediction value. In the above embodiment, the prediction value of the happiness strength is calculated using the happiness coefficient table as illustrated in FIG. 11, but the present embodiment is not limited to such an example, and, for example, an average value of the happiness strengths when the user saw the rainbow in the past may be calculated as the happiness strength prediction value on the basis of the happiness history. Further, the happiness strength prediction value is not limited to the average value of the previous happiness strengths and may be, for example, a median value or a value of the happiness strength of the latest happiness history. Further, in a case in which a rainbow occurrence probability (for example, a percentage) is included in the rainbow information, the happiness predicting unit 203 may, for example, multiply the average value of the happiness strengths based on the previous happiness history by the rainbow occurrence probability and predict the happiness strength using the rainbow occurrence probability as a weight. Further, the happiness predicting unit 203 may perform the multiplication using "1" as the weight in a case in which the rainbow occurrence probability exceeds a predetermined threshold value, for example, 50%.

The happiness prediction may be performed periodically (for example, hourly) also in each prediction process described above including the present embodiment so that the prediction result is continuously updated, but the prediction may be performed after necessary data is acquired from the external server 4 when there is a forecast request from the user.

Then, the happiness predicting unit 203 extracts the happiness item (here, the "camera") associated with the occurrence of happiness with reference to the happiness history of the user A (step S309).

Then, the storage control unit 204 accumulates the happiness prediction result in the happiness prediction result storage unit 230 (step S312).

Then, the happiness information presentation control unit 205 generates a forecast map image on the basis of the happiness prediction result (step S315). A specific example of the forecast map image according to the present embodiment will be described later.

Then, the happiness information presentation control unit 205 performs control such that the generated forecast map is presented to the user through the user terminal 1 (step S318). The forecast map also includes the happiness item, and when the user sees the today happiness forecast for the user, the user is able to understand in advance that the happiness will occur if the user carries the camera around 15 o'clock although a reason is not known.

(Display Example of Personal Happiness Prediction)

Next, a display example of personal happiness prediction according to the present embodiment will be specifically described. The display example of the personal happiness prediction can also be performed as in the heat map or the weather forecast, similarly to the display method of the happiness prediction for the specific community described above with reference to FIGS. 14 to 19. A specific description will proceed below with reference to FIGS. 22 to 24.

Figure 22:
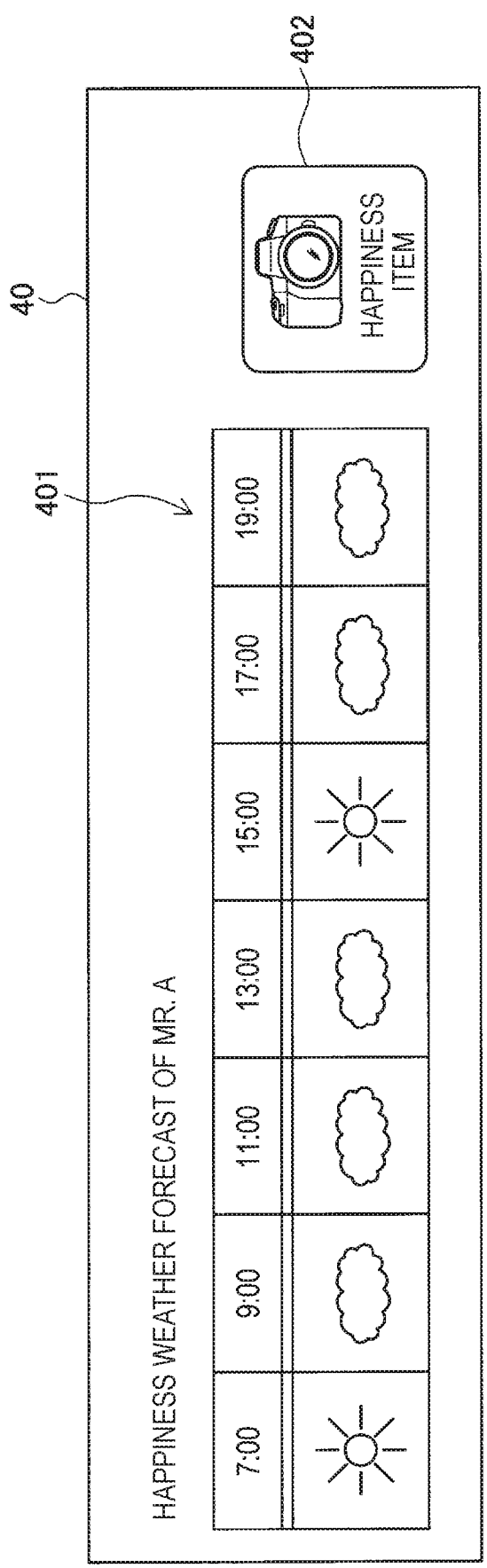
FIG. 22 is a diagram illustrating a screen display example in a case in which a personal happiness forecast process of a user according to the present embodiment is expressed similarly to an hourly weather forecast of one day.

FIG. 22 is a diagram illustrating a screen display example in a case in which the personal happiness forecast for the user according to the present embodiment is expressed similarly to the hourly weather forecast of one day. In the illustrated example, for example, a happiness forecast image 401 having an interval of 2 hours is displayed on a screen 40 using the weather icons as the happiness forecast for the user A. Similarly to the above embodiment, for example, in the weather icons, the happiness strength 1 to 0.5 is indicated by the sunny icon, the happiness strengths 0.5 to −0.5 are indicated by the cloudy icon, and the happiness strengths −0.5 to −1 are indicated by the rainy icon (not illustrated). Further, a happiness item image 402 is also displayed on the screen 40. Accordingly, the user is able to spend a day with the happiness item (the camera in the example illustrated in FIG. 22) and have the happiness (for example, the user encounters the rainbow in the Y city which the user is scheduled to visit at 15:00 and takes a picture, and thus the stronger happiness occurs).

Figure 23:
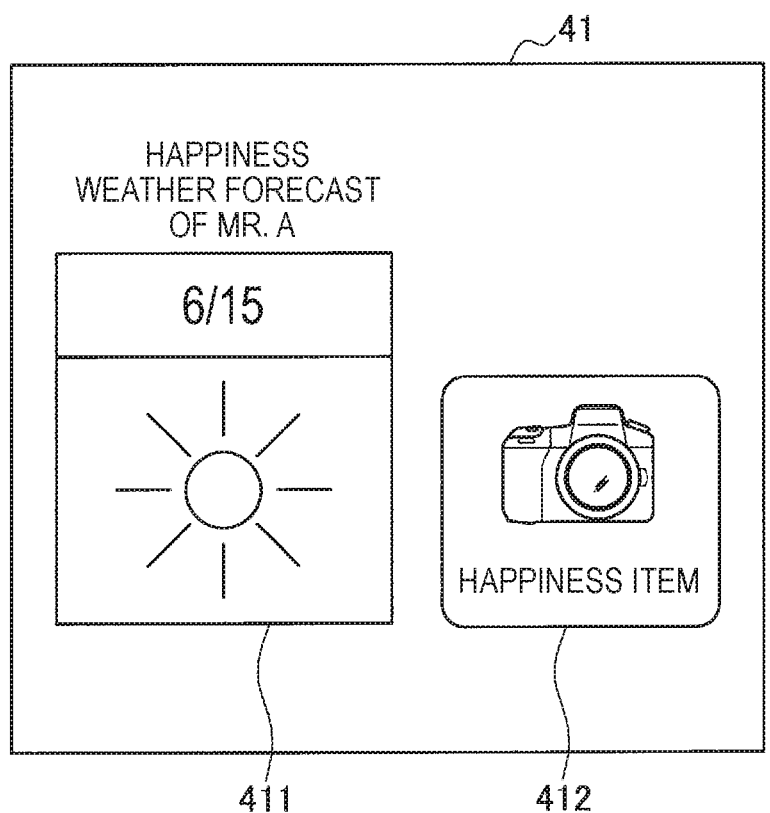
FIG. 23 is a diagram illustrating a screen display example in a case in which an overall one-day personal happiness forecast for a user according to the present embodiment is expressed similarly to a weather forecast.

FIG. 23 is a diagram illustrating a screen display example in a case in which an overall one-day personal happiness forecast for the user according to the present embodiment is expressed similarly to the weather forecast. In the illustrated example, a happiness weather forecast image 411 of the user A and a happiness item image 412 of the user A are displayed on a screen 41. The happiness weather forecast image 411 is an image in which a corresponding weather icon is simply displayed as an overall happiness forecast of the day.

Figure 24:
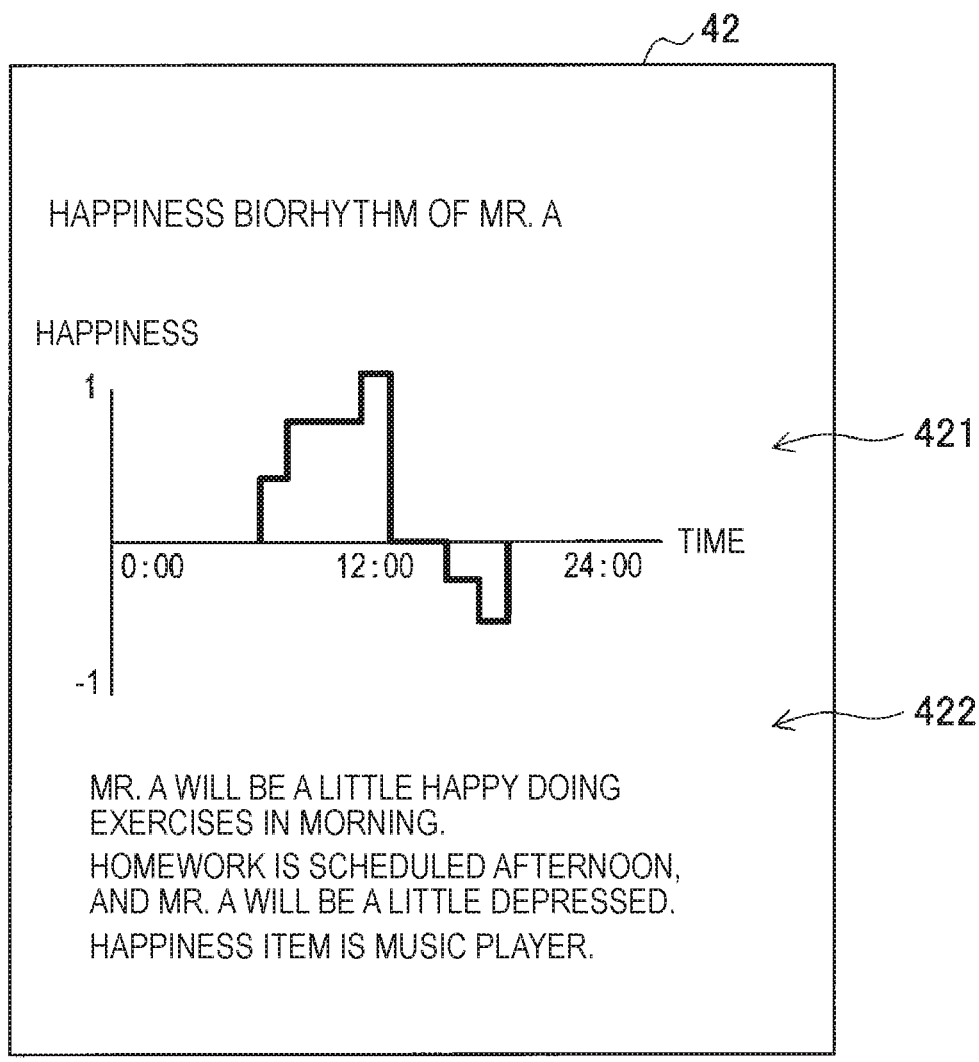
FIG. 24 is a diagram illustrating a screen display example in which a personal happiness forecast process of a user according to the present embodiment is expressed similarly to a biorhythm.

FIG. 24 is a diagram illustrating a screen display example in which the happiness forecast for the user according to the present embodiment is displayed similarly to a biorhythm. In the illustrated example, a graph 421 indicating an hourly change in happiness and text 422 related to contents of the forecast are displayed on a screen 42. Accordingly, the user is able to know intuitively in advance what kind of emotion the user is likely to have today. In the example illustrated in FIG. 24, both the graph 421 of the biorhythm and the text 422 related to the forecast contents are displayed, but only one of them may be displayed.

<<4. Conclusion>>

As described above, in the information processing system according to the embodiment of the present disclosure, it is possible to predict a level of a specific emotion in a specific place at a specific time.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

For example, it is also possible to create a computer program causing hardware such as a CPU, a ROM, and a RAM installed in the user terminal 1 or the happiness management server 2 to implement the functions of the user terminal 1 or the happiness management server 2. Further, a computer readable storage medium having the computer program stored therein is also provided.

Further, in the above-described embodiment, the system configuration including the happiness management server 2 and the user terminal 1 is provided, but the present disclosure is not limited thereto, and, for example, the user terminal 1 may have the function of the happiness management server 2, and the above-mentioned happiness analysis, accumulation of the happiness history, and happiness prediction may be performed in the user terminal 1.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system, including:

an accumulating unit configured to accumulate an emotion history in which a level of a specific emotion calculated on a basis of a behavior history of a user, a date and time and a position at which the specific emotion occurs, and an associated keyword are associated; and a control unit configured to predict a level of the specific emotion in a specific place at a specific date and time from a relation between at least any one of the specific date and time, the specific place, and a keyword associated with the date and time or the place and the emotion history accumulated in the accumulating unit.

(2)

The information processing system according to (1), in which the control unit specifies a user located near a specific place at a specific date and time on a basis of schedules of a plurality of users, extracts a level of an emotion of an emotion history related to a keyword associated with the specific date and time and the specific place on a basis of an emotion history of the specified user, and predicts a level of the specific emotion in the specific place at the specific date and time.

(3)

The information processing system according to (2), in which the control unit predicts a level of the specific emotion of a specific user in a specific place at a specific date and time on a basis of a future schedule of the specific user, a level of the specific emotion of the specific user stored as an emotion history, and the keyword.

(4)

The information processing system according to (2), in which the control unit extracts a similar user whose preference is similar to preference of a specific user from the emotion history accumulated in the accumulating unit, and the control unit specifies a user located near a specific place at a specific date and time on a basis of a schedule of the similar user, extracts a level of an emotion of an emotion history related to a keyword associated with the specific date and time and the specific place on a basis of an emotion history of the specified user, and predicts a level of the specific emotion in the specific place at the specific date and time.

(5)

The information processing system according to any one of (2) to (4), in which an item held by the user is included in a happiness history serving as the emotion history accumulated in the accumulating unit in association with a happiness strength serving as the level of the specific emotion, and the control unit predicts a happiness strength of a specific user on a basis of a future schedule of the specific user, the happiness strength of the specific user stored as the happiness history, the keyword, and the item, and specifies an item to be recommended to a user.

(6)

The information processing system according to any one of (1) to (5), in which the control unit calculates a level of the specific emotion on a basis of at least one of a facial expression of the user, an emotion recognition result based on a voice of the user, a result of converting the voice of the user into text and performing language analysis on the text, the user, and contents posted to social media by the user.

(7)

The information processing system according to any one of (1) to (6), further including, a communication unit configured to receive a request for requesting an emotion forecast map in a specific place at a specific date and time from an external device, in which the control unit performs control such that a level of the specific emotion in a specific place at a specific date and time is predicted from a relation of the specific date and time and the specific place, a keyword associated with the date and time and the place, and the emotion history accumulated in the accumulating unit, and an emotion forecast map is generated on a basis of the level of the specific emotion, and the generated emotion forecast map is transmitted to the external device through the communication unit.

(8)

The information processing system according to (7), in which the control unit performs control such that a user located around the specific place at the specific date and time is specified on a basis of schedules of a plurality of users, a level of the specific emotion of the specific user in the specific place at the specific date and time is predicted from a relation between the level of the specific emotion included in the emotion history of the specified user and a keyword associated with the specific date and time and the specific place, and an emotion forecast map is generated in accordance with the level of the specific emotion, and the generated emotion forecast map is transmitted to the external device through the communication unit.

(9)

The information processing system according to (8), in which the communication unit receives a request for requesting an emotion forecast map of a specific user in a specific place at a specific date and time from the external device, and the control unit performs control such that a level of the specific emotion of the specific user is predicted on a basis of a future schedule of the specified user, the level of the specific emotion of the specific user stored as the emotion history, and the keyword, and an emotion forecast map is generated in accordance with the level of the specific emotion, and the emotion forecast map for the specific user is transmitted to the external device through the communication unit.

(10)

The information processing system according to (8), in which the communication unit receives a request for requesting an emotion forecast map of a similar user whose preference is similar to preference of a specific user in a specific place at a specific date and time from the external device, and the control unit performs control such that the similar user whose preference is similar to preference of the specific user is extracted from the emotion history accumulated in the accumulating unit, a user located near the specific place at the specific date and time is specified on a basis of a schedule of the similar user, a level of the specific emotion in the specific place at the specific date and time is predicted from a relation between the emotion history of the specified user and a keyword associated with the specific date and time and the specific place, and an emotion forecast map is generated in accordance with the level of the specific emotion, and the emotion forecast map for the similar user is transmitted to the external device through the communication unit.

(11)

An information processing method, including:

accumulating in an accumulating unit, by a processor, an emotion history in which a level of a specific emotion calculated on a basis of a behavior history of a user, a date and time and a position at which the specific emotion occurs, and an associated keyword are associated; and predicting, by the processor, a level of the specific emotion in a specific place at a specific date and time from a relation between at least any one of the specific date and time, the specific place, and a keyword associated with the date and time or the place and the emotion history accumulated in the accumulating unit.

REFERENCE SIGNS LIST 1 user terminal
100 control unit
110 communication unit
120 position information acquiring unit
130 camera
140 microphone
150 operation input unit
160 storage unit
170 display unit
180 speaker
2 happiness management server
200 control unit 201 information analyzing unit
202 happiness analyzing unit
203 happiness predicting unit
204 storage control unit
205 happiness information presentation control unit
210 communication unit
220 happiness history storage unit
230 happiness prediction result storage unit

The invention claimed is:

1. An information processing system, comprising:
a storage device; and
a central processing unit (CPU) configured to:
acquire a behavior history of a first user of a plurality of users, wherein
the behavior history includes post data of the first user, and
the post data corresponds to content posted on social media by the first user;
perform language analysis on text included in the content;
determine a first level of a specific emotion based on the language analysis;
acquire image data of the first user;
recognize an item associated with an occurrence of the specific emotion from the image data;
extract a first keyword associated with the first level of the specific emotion;
control the storage device to store, as an emotion history, the first level of the specific emotion, a date and time and a position at which the specific emotion occurs, the item, and the first keyword;
predict a second level of the specific emotion in a specific place at a specific date and time based on a relation between the emotion history and at least one of the specific date and time, the specific place, or a second keyword associated with the specific date and time or the specific place;
extract the item associated with the occurrence of the specific emotion from the emotion history;
generate an emotion forecast map based on the second level of the specific emotion, wherein
the emotional forecast map corresponds to an image that includes icons and the extracted item, and
the icons indicate the second level of the specific emotion at the specific date and time; and
transmit the generated emotion forecast map to an external device, wherein the external device displays the emotion forecast map to the first user.

2. The information processing system according to claim 1, wherein the CPU is further configured to:
specify the first user located near the specific place at the specific date and time based on schedules of the plurality of users;
extract, based on the emotion history of the first user, the first level of the specific emotion related to the second keyword associated with the specific date and time and the specific place; and
predict the second level of the specific emotion in the specific place at the specific date and time based on the extracted first level of the specific emotion related to the second keyword.

3. The information processing system according to claim 2, wherein the CPU is further configured to predict the second level of the specific emotion of the first user in the specific place at the specific date and time based on a future schedule of the first user, the first level of the specific emotion of the first user stored as the emotion history, and the second keyword.

4. The information processing system according to claim 2, wherein the CPU is further configured to:
extract, from the emotion history, a second user of the plurality of users, wherein a preference of the second user is similar to a preference of the first user; and
specify the first user located near the specific place at the specific date and time based on a schedule of the second user;
extract, based on the emotion history of the first user, the first level of the specific emotion related to the second keyword associated with the specific date and time and the specific place; and
predict the second level of the specific emotion in the specific place at the specific date and time based on the extracted first level of the specific emotion related to the second keyword.

5. The information processing system according to claim 2, wherein
the item is held by the first user,
the item is associated with a first happiness strength that corresponds to the first level of the specific emotion, and
the CPU is further configured to:
predict a second happiness strength of the first user based on a future schedule of the first user, the first happiness strength of the first user stored as the emotion history, the second keyword, and the item; and
recommend the item to the first user.

6. The information processing system according to claim 1, wherein
the behavior history further includes at least one of a facial expression of the first user or a voice of the first user, and
the CPU is further configured to perform emotion recognition based on the voice of the first user and perform the language analysis on text included in the voice of the first user.

7. The information processing system according to claim 1, further comprising a communication network configured to receive a request for the emotion forecast map in the specific place at the specific date and time from the external device,
wherein the CPU is further configured to:
predict the second level of the specific emotion in the specific place at the specific date and time based on the relation of the specific date and time and the specific place, the second keyword associated with the specific date and time and the specific place, and the emotion history;
generate the emotion forecast map based on the second level of the specific emotion; and
transmit the generated emotion forecast map to the external device via the communication network.

8. The information processing system according to claim 7,
wherein the CPU is further configured to:
specify the first user located around the specific place at the specific date and time based on schedules of the plurality of users;
predict the second level of the specific emotion of the first user in the specific place at the specific date and time based on a relation between the first level of the specific emotion included in the emotion history of the first user and the second keyword associated with the specific date and time and the specific place;

generate the emotion forecast map based on the second level of the specific emotion of the first user; and transmit the generated emotion forecast map for the first user to the external device via the communication network.

9. The information processing system according to claim 8, wherein the communication network is configured to receive the request for the emotion forecast map of the first user in the specific place at the specific date and time from the external device, and the CPU is further configured to:

predict the second level of the specific emotion of the first user based on a future schedule of the first user, the first level of the specific emotion of the first user, and the second keyword;

generate the emotion forecast map based on the second level of the specific emotion of the first user; and transmit the emotion forecast map for the first user to the external device via the communication network.

10. The information processing system according to claim 8, wherein the communication network is further configured to receive the request for the emotion forecast map of a second user of the plurality of users from the external device, wherein a preference of the second user is similar to a preference of the first user in the specific place at the specific date and time, and the CPU is further configured to:

extract, from the emotion history, the second user, specify the first user located near the specific place at the specific date and time based on a schedule of the second user;

predict the second level of the specific emotion in the specific place at the specific date and time based on a relation between the emotion history of the first user and the second keyword associated with the specific date and time and the specific place;

generate the emotion forecast map based on the second level of the specific emotion; and transmit the emotion forecast map for the second user to the external device via the communication network.

11. An information processing method, comprising:

in an information processing system that includes a central processing unit (CPU):

acquiring, by the CPU, a behavior history of a user of a plurality of users, wherein the behavior history includes post data of the user, and the post data corresponds to content posted on social media by the user;

performing, by the CPU, language analysis on text included in the content;

determining, by the CPU, a first level of a specific emotion based on the language analysis;

acquiring, by the CPU, image data of the user;

recognizing, by the CPU, an item associated with an occurrence of the specific emotion from the image data;

extracting, by the CPU, a first keyword associated with the first level of the specific emotion;

controlling, by the CPU, an storage device to store, as an emotion history, the first level of the specific emotion, a date and time and a position at which the specific emotion occurs, the item, and the first keyword;

predicting, by the CPU, a second level of the specific emotion in a specific place at a specific date and time based on a relation between the emotion history and at least one of the specific date and time, the specific place, or a second keyword associated with the specific date and time or the specific place;

extracting, by the CPU, the item associated with the occurrence of the specific emotion from the emotion history;

generating, by the CPU, an emotion forecast map based on the second level of the specific emotion, wherein the emotional forecast map corresponds to an image that includes icons and the extracted item, and the icons indicate the second level of the specific emotion at the specific date and time; and transmitting, by the CPU, the generated emotion forecast map to an external device, wherein the external device displays the emotion forecast map to the user.

* * * * *